United States Patent
Kapatralla et al.

(10) Patent No.: US 10,638,524 B2
(45) Date of Patent: Apr. 28, 2020

(54) METHOD AND SYSTEM FOR PROVIDING MISSION CRITICAL SERVICE (MCX) IN WIRELESS COMMUNICATION NETWORK

(71) Applicant: SAMSUNG ELECTRONICS CO., LTD., Suwon-si (KR)

(72) Inventors: Irshad Ahamed Kapatralla, Kadapa (IN); Kiran Gajula, Karimnagar (IN); Narasimha Rao Thurlapati, Narasaraopet (IN); Thiyagesh Kalyanaraman, Chennai (IN); Sapan Pramodkumar Shah, Bengaluru (IN)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 8 days.

(21) Appl. No.: 16/050,654

(22) Filed: Jul. 31, 2018

(65) Prior Publication Data

US 2019/0037617 A1     Jan. 31, 2019

(30) Foreign Application Priority Data

Jul. 31, 2017   (IN) .............................. 201741027185
Jul. 27, 2018   (IN) .............................. 201741027185

(51) Int. Cl.
*H04W 76/11*    (2018.01)
*H04W 76/16*    (2018.01)
(Continued)

(52) U.S. Cl.
CPC ............. *H04W 76/11* (2018.02); *H04L 12/66* (2013.01); *H04L 63/0861* (2013.01);
(Continued)

(58) Field of Classification Search
CPC ..... H04W 76/11; H04W 76/16; H04W 60/04; H04L 12/66; H04L 63/0861
See application file for complete search history.

(56) References Cited

U.S. PATENT DOCUMENTS 7,970,425 B2    6/2011  Balachandran et al.
9,451,421 B1 *  9/2016  Allen ...................... H04W 4/10
(Continued)

FOREIGN PATENT DOCUMENTS

EP        2908492 A1    8/2015
WO    2016/003157 A1    1/2016
(Continued)

OTHER PUBLICATIONS

International Search Report (PCT/ISA/210) dated Nov. 28, 2018 issued by the International Searching Authority in International Application No. PCT/KR2018/008702.
(Continued)

*Primary Examiner* — Mohammad S Anwar
(74) *Attorney, Agent, or Firm* — Sughrue Mion, PLLC

(57) ABSTRACT

A method and system for providing mission critical service (MCX) in a wireless communication network are provided. The method includes receiving, by a network-bridge entity, a communication request from an electronic device in a non-MCX zone. The network-bridge entity interfaces communication between the non-MCX zone and an MCX zone in the wireless communication network. Further, the method includes performing, by the network-bridge entity, a registration of the electronic device with an MCX server present in the MCX zone. Further, the method includes establishing, by the network-bridge entity, an MCX with the MCX server. Further, the method includes transferring, by the network-bridge entity, an MCX functionality to the electronic device in the non-MCX zone.

20 Claims, 23 Drawing Sheets

(51) Int. Cl.
    *H04L 12/66* (2006.01)
    *H04L 29/06* (2006.01)
    *H04W 60/04* (2009.01)
    *H04W 4/90* (2018.01)
    *H04W 4/029* (2018.01)
    *H04L 29/08* (2006.01)

(52) U.S. Cl.
    CPC ...... *H04L 65/1016* (2013.01); *H04L 65/1046* (2013.01); *H04L 65/1073* (2013.01); *H04L 65/4038* (2013.01); *H04W 4/90* (2018.02); *H04W 60/04* (2013.01); *H04W 76/16* (2018.02); *H04L 67/34* (2013.01); *H04W 4/029* (2018.02)

(56) References Cited

U.S. PATENT DOCUMENTS

| | | | |
|---|---|---|---|
| 9,510,166 | B1 | 11/2016 | Allen et al. |
| 10,425,884 | B2 * | 9/2019 | Hahn ................... H04W 48/16 |
| 2013/0019277 | A1 * | 1/2013 | Chang ................. H04L 63/0218 726/1 |
| 2016/0344726 | A1 | 11/2016 | Stojanovski et al. |
| 2017/0048894 | A1 | 2/2017 | Choi et al. |
| 2017/0099118 | A1 | 4/2017 | Negalaguli et al. |

FOREIGN PATENT DOCUMENTS

| | | |
|---|---|---|
| WO | 2016/111528 A1 | 7/2016 |
| WO | 2016/162722 A1 | 10/2016 |
| WO | 2016/204514 A1 | 12/2016 |

OTHER PUBLICATIONS

Written Opinion (PCT/ISA/327) dated Nov. 28, 2018 issued by the International Searching Authority in International Application No. PCT/KR2018/008702.

* cited by examiner

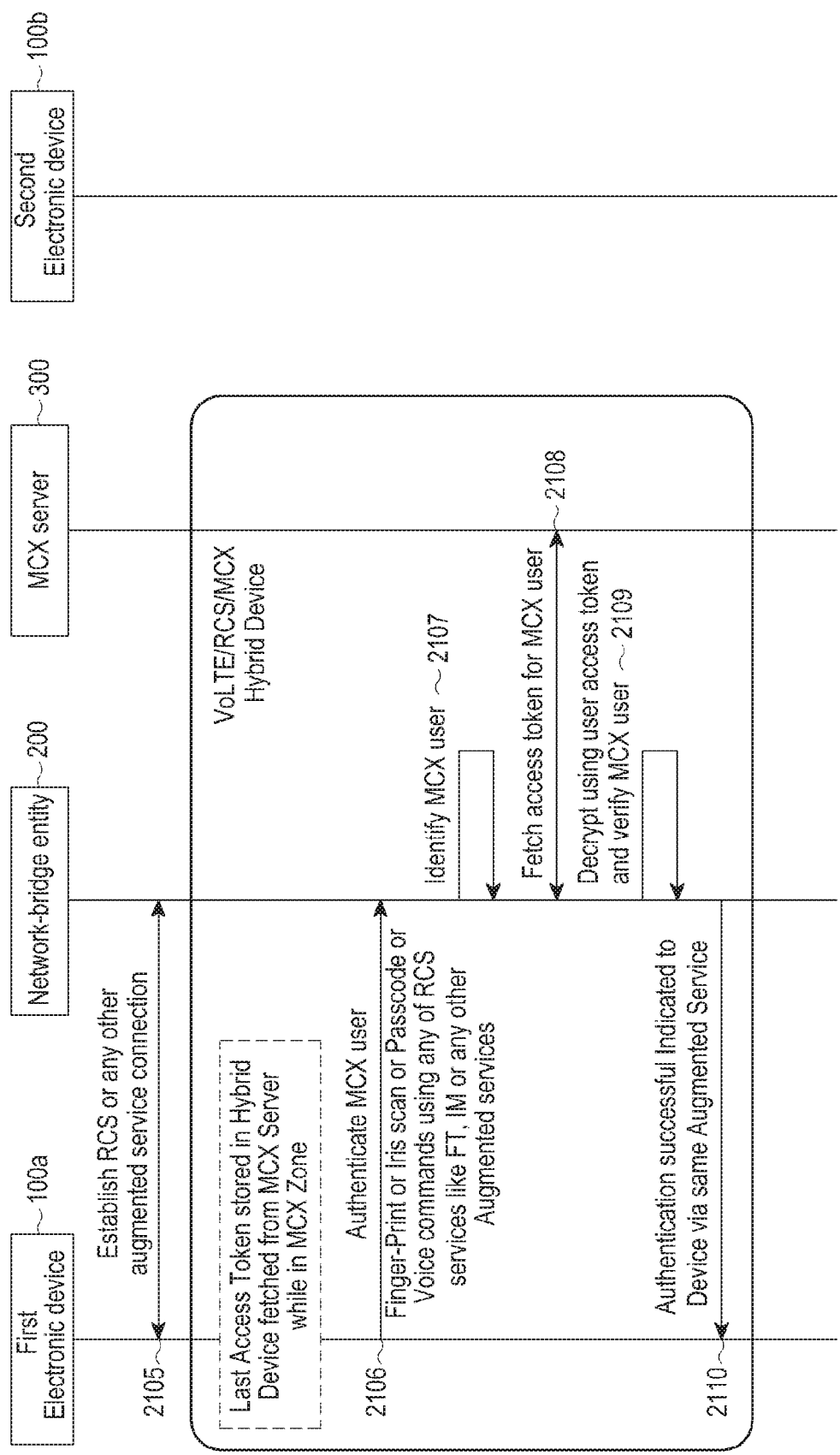

METHOD AND SYSTEM FOR PROVIDING MISSION CRITICAL SERVICE (MCX) IN WIRELESS COMMUNICATION NETWORK

CROSS-REFERENCE TO RELATED APPLICATIONS

This application is based on and claims priority under 35 U.S.C. § 119 to Indian Provisional Patent Application No. 201741027185, filed on Jul. 31, 2017, in the Indian Patent Office, and Indian Complete Patent Application No. 201741027185, filed on Jul. 27, 2018, in the Indian Patent Office, the disclosures of which are incorporated by reference herein in their entireties.

BACKGROUND

1. Field

The disclosure relates to a method and system for providing a mission critical service (MCX) in a wireless communication network.

2. Description of Related Art

Mission critical service (MCX) users may not be able to access any of MCXes while they are in a non-MCX zone during critical conditions (e.g., emergency situation or the like). The MCX users are the authorized users to access an MCX server. The non-MCX zone is a coverage area in which there are no MCXes available but conventional internet protocol multimedia subsystem (IMS) services like voice over long-term evolution (VoLTE), voice over Wi-Fi (VoWiFi), etc. are available. Unavailability of service during critical situations may greatly hamper the efforts by first-responders to locate and rescue those individuals who are in need. Due to a large number of countries sharing common borders in the European Union (EU), efforts involving Interpol, anti-trafficking, anti-terrorism, etc. may be immensely impacted. Search and rescue efforts may be disrupted while the first-responders/MCX users enter non-MCX zones. Additionally, there is no provision that allows common citizens in critical situations to access the MCX server. These scenarios will become much more commonplace as carriers in certain countries continue to adopt the "Bring Your Own Device (BYOD)" policy that allows subscribers to use a wider variety of mobile devices that may or may not be preapproved by the respective carriers.

FIG. 1 and FIG. 2 illustrate example scenarios in which a user of an electronic device accesses the MCX, according to the related art. According to an example shown in FIG. 1, the user of the electronic device on an MCX call moves from the MCX zone to a VoLTE-only zone and loses out on the MCXes immediately. In another example shown in FIG. 2, the user has the electronic device, where the electronic device includes the MCX capability. The user with an MCX-only device moves from the MCX zone to the VoLTE-only zone and hence could not access any MCXes further. In both cases, the MCX user moving into the VoLTE-only zone would not be able to access any MCXes further, resulting in a complete loss of MCX.

Thus, there exists a need to address the above mentioned disadvantages or other shortcomings and provide a useful alternative.

SUMMARY

Provided are a method and system for providing MCX in a wireless communication network.

An aspect of one or more embodiments herein is to receive, by a network-bridge entity, a communication request from an electronic device in a non-MCX zone, where the network-bridge entity interfaces communication between the non-MCX zone and an MCX zone in the wireless communication network.

Another aspect of one or more embodiments herein is to perform, by the network-bridge entity, a registration of the electronic device with an MCX server present in the MCX zone.

Another aspect of one or more embodiments herein is to establish, by the network-bridge entity, an MCX with the MCX server.

Another aspect of one or more embodiments herein is to transfer, by the network-bridge entity, an MCX functionality to the electronic device in the non-MCX zone.

Another aspect of one or more embodiments herein is to receive, by the network-bridge entity, a MCX user interface (UI) from the MCX server representing one of a flow of the MCX and the MCX functionality.

Another aspect of one or more embodiments herein is to generate, by the network-bridge entity, a virtual MCX UI simulating the MCX UI received from the MCX server.

Another aspect of one or more embodiments herein is to transfer, by the network-bridge entity, the virtual MCX UI to the electronic device.

Additional aspects will be set forth in part in the description which follows and, in part, will be apparent from the description, or may be learned by practice of the presented embodiments.

In accordance with an aspect of the disclosure, there is provided a method for providing a mission critical service (MCX) in a wireless communication network. The method may include receiving, by a network-bridge entity that interfaces communication between the non-MCX zone and an MCX zone in the wireless communication network, a communication request from an electronic device that is in a non-MCX zone; registering, by the network-bridge entity, the electronic device with an MCX server that is in the MCX zone; establishing, by the network-bridge entity, an MCX with the MCX server; and transferring, by the network-bridge entity, an MCX functionality to the electronic device in the non-MCX zone.

The MCX functionality may be at least one of an MCX request for accessing a floor and sharing an MCX user interface (UI).

The transferring the MCX functionality to the electronic device in the non-MCX zone may include: connecting the electronic device in the non-MCX zone with the established MCX; receiving a request from the electronic device to access floor or transmission control for media transmission with the MCX server; and notifying the electronic device of at least one access response from the MCX.

The communication request may be at least one of a voice over long-term evolution (VoLTE) communication request, a video over LTE (ViLTE) communication request, a voice over new radio (VoNR) communication request, and a voice over Wi-Fi (VoWiFi) communication request.

The network-bridge entity may be one of a gateway, a server, and a relay.

The relay may be a hybrid electronic device, which is capable of the MCX and a packet switched (PS) service, and registered in an MCX network.

The method may further include: receiving, by the network-bridge entity, an MCX user interface (UI) from the MCX server representing one of a flow of the MCX and the MCX functionality; generating, by the network-bridge entity, a virtual MCX UI simulating the MCX UI received from the MCX server; and transferring, by the network-bridge entity, the virtual MCX UI to the electronic device.

The virtual MCX UI may be transferred by the network-entity to the electronic device using one of a VoLTE communication request, a ViLTE communication request, a VoNR communication request, and a VoWiFi communication request.

The network-bridge entity may authenticate the electronic device based on at least one of biometric data and access token of a user of the electronic device before establishing the MCX with the MCX server.

The access token stored in the electronic device was fetched from the MCX server, while the electronic device had been in the MCX zone.

In accordance with an aspect of the disclosure, there is provided a network-bridge entity for providing an MCX in a wireless communication network. The network-bridge entity may include a processor, a memory, and an MCX controller configured to interface communication between a non-MCX zone and an MCX zone in the wireless communication network. The MCX controller may be configured to receive a communication request from an electronic device that is in the non-MCX zone; register the electronic device with an MCX server that is in the MCX zone; establish an MCX with the MCX server; and transfer an MCX functionality to the electronic device in the non-MCX zone.

BRIEF DESCRIPTION OF THE DRAWINGS

The above and other aspects, features, and advantages of certain embodiments of the present disclosure will be more apparent from the following description taken in conjunction with the accompanying drawings, in which:

FIG. 21A and FIG. 21B illustrate other flow diagrams illustrating various operations for the authentication procedures over the RCS during the augmented MCX, according to an embodiment.

DETAILED DESCRIPTION

Figure 1:
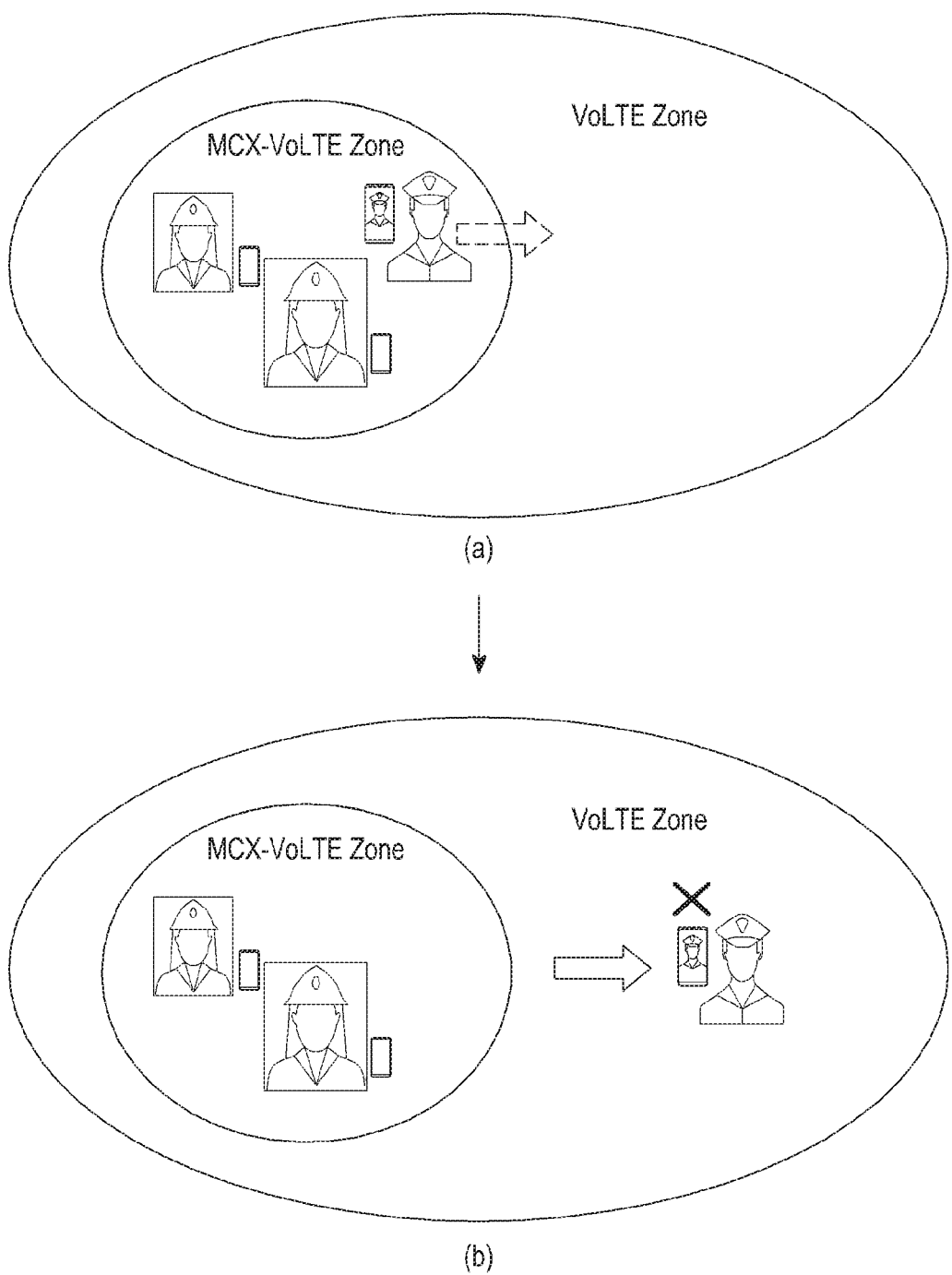
FIG. 1 and FIG. 2 illustrate example scenarios in which a user of an electronic device performs an MCX, according to the related art.
Figure 2:
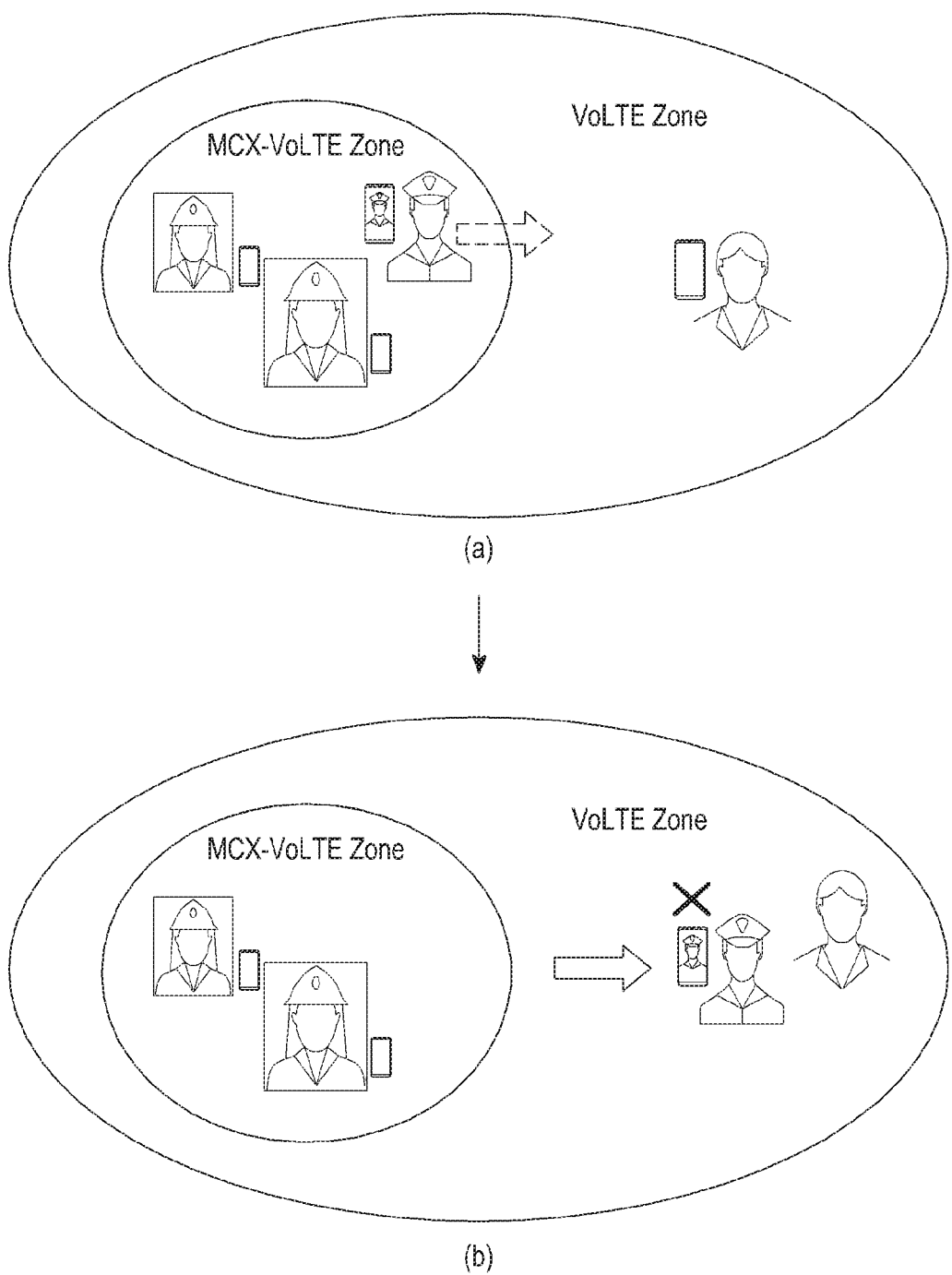

Embodiments and various features and advantageous details thereof will be explained more fully with reference to the accompanying drawings. Descriptions of well-known components and processing techniques are omitted so as to not unnecessarily obscure the embodiments herein. Also, the various embodiments described herein are not necessarily mutually exclusive, as some embodiments can be combined with one or more other embodiments to form new embodiments. The term "or" as used herein, refers to a non-exclusive "or," unless otherwise indicated. The examples used herein are intended merely to facilitate an understanding of ways in which the embodiments herein can be practiced and to further enable those skilled in the art to practice the embodiments herein. Accordingly, the examples should not be construed as limiting the scope of the embodiments herein.

Embodiments may be described and illustrated in terms of blocks which carry out a described function or functions. These blocks, which may be referred to herein as units or modules or the like, may be implemented with software (e.g., code, applications, programs, instructions, firmware, etc.), and/or physically implemented by analog or digital circuits such as logic gates, integrated circuits, microprocessors, microcontrollers, memory circuits, passive electronic components, active electronic components, optical components, hardwired circuits, or the like. The circuits may, for example, be embodied in one or more semiconductor chips, or on substrate supports such as printed circuit boards and the like. The circuits constituting a block may be implemented by dedicated hardware, or by a processor (e.g., one or more programmed microprocessors and associated circuitry), or by a combination of dedicated hardware to perform some functions of the block and a processor to perform other functions of the block. Each block of the embodiments may be physically separated into two or more interacting and discrete blocks without departing from the scope of the invention. Likewise, the blocks of the embodiments may be physically combined into more complex blocks without departing from the scope of the invention.

Herein, expressions such as "at least one of," when preceding a list of elements, modify the entire list of elements and do not modify the individual elements of the list. For example, the expression, "at least one of a, b, and c," should be understood as including only a, only b, only c, both a and b, both a and c, both b and c, or all of a, b, and c.

The accompanying drawings are used to help easily understand various technical features and it should be understood that the embodiments presented herein are not limited by the accompanying drawings. As such, the present disclosure should be construed to extend to any alterations, equivalents and substitutes in addition to those which are particularly set out in the accompanying drawings. Although the terms "first," "second," etc. may be used herein to describe various elements, these elements should not be limited by these terms. These terms are generally only used to distinguish one element from another and do not necessarily imply order or priority.

Accordingly, embodiments herein disclose a method for providing a mission critical service (MCX) in a wireless communication network. The method includes receiving, by a network-bridge entity, a communication request from an electronic device in a non-MCX zone. The network-bridge entity interfaces communication between the non-MCX zone and an MCX zone in the wireless communication network. Further, the method includes performing, by the network-bridge entity, a registration of the electronic device with an MCX server present (e.g., located) in the MCX zone. Further, the method includes establishing, by the network-bridge entity, an MCX with the MCX server. Further, the method includes transferring, by the network-bridge entity, an MCX functionality to the electronic device in the non-MCX zone.

Unlike conventional methods and systems, the proposed methods can be used to provide reliable critical communications on the electronic device (e.g., hybrid public safety (PS-LTE) devices or PS-capable electronic devices) in the non-MCX zones in an effective manner.

The method can be used to provide the MCX in the wireless communication network without any change in a VoLTE ecosystem, VoNR ecosystem, ViLTE ecosystem, or VoWiFi ecosystem; or minimal changes in a feature like enhanced authentication procedures and data security of the VoLTE eco-system, VoNR ecosystem, ViLTE ecosystem, or VoWiFi ecosystem. The method can be used to achieve quality of service (QoS) and reliability as good as that of MCX calls using the VoLTE. Based on the proposed method, a user of the electronic device can make a ViLTE/VoLTE/VoNR/VoWiFi call to a predefined phone number (e.g. 9999) associated with the network-bridge entity in a home PS-LTE network. Based on the proposed methods, uninterrupted service can be achieved while moving from the MCX zone to the non-MCX zone.

Based on the proposed methods, the relay device can anchor the ViLTE/VoLTE/VoNR/VoWiFi call originating from the non-MCX zone with the MCX sessions on the home PS-LTE network in an effective manner. The method can be used to provide the reliable critical communications on hybrid devices (e.g., the electronic device having a push-to-talk (PTT) capability, a PS-capable electronic device, an electronic device in non-PTT zones, etc.).

Referring now to the drawings, and more particularly to FIGS. 3 through 21B, embodiments will be described where similar reference characters denote corresponding features consistently throughout the figures.

Figure 3:
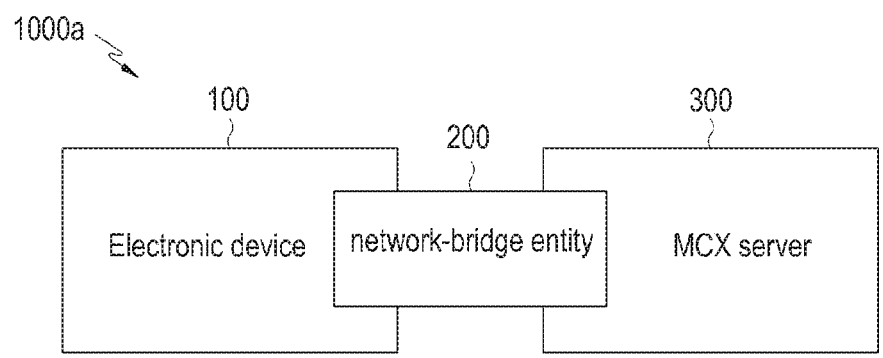
FIG. 3 illustrates an overview of a system for providing MCX in a wireless communication network, according to an embodiment.

FIG. 3 illustrates an overview of a system 1000a for providing an MCX in a wireless communication network, according to an embodiment. In an embodiment, the system 1000a includes an electronic device 100, a network-bridge entity 200, and an MCX server 300. The electronic device 100 may be, for example but not limited to, a cellular phone, a tablet, a smart phone, a laptop, a personal digital assistant (PDA), a global positioning system (GPS), a multimedia device, a video device, or the like. The electronic device 100 may also be referred to by those skilled in the art as a hybrid MCX-VoLTE device, a stand-alone MCX device, an MCX-VoLTE relay, an augmented MCX-VoLTE device, a multi device MCX-VoLTE device, or the like.

The electronic device 100 is compliant with multiple, different communication protocols that can operate as a multi-mode device by communicating within a fourth generation (4G) network employing any common type of LTE or LTE-advanced (LTE-A) radio access technology (RAT), as well as within a third generation (3G) or a second generation (2G) network employing any common type of legacy RAT or a VoNR network, and a VoWiFi network.

The network-bridge entity 200 can be, for example but not limited to, a gateway, a server, or a relay. In an embodiment, the relay can be a hybrid electronic device, which is capable of both MCX and PS service, and registered in an MCX network.

In an embodiment, the network-bridge entity 200 is configured to receive a communication request from the electronic device 100 in a non-MCX zone. The non-MCX zone is a coverage area in which there are no MCXes available but conventional IMS services like VoLTE, VoWiFi, etc. may be available. The communication request can be, for example but not limited to, a VoLTE communication request, a ViLTE communication request, a VoNR communication request, a VoWiFi communication request, a voice over PS (VoPS) communication request, or the like.

The network-bridge entity 200 interfaces communication between the non-MCX zone and an MCX zone in the wireless communication network. The MCX zone is a coverage area in which the MCXes are available. Based on the communication request, the network-bridge entity 200 is configured to perform a registration of the electronic device 100 with an MCX server 300 present in the MCX zone. Based on the registration, the network-bridge entity 200 is configured to establish an MCX with the MCX server 300. The network-bridge entity 200 is configured to transfer an MCX functionality to the electronic device 100 in the non-MCX zone. The MCX functionality can be, for example but not limited to, an MCX request for accessing a floor and sharing an MCX user interface (UI).

In an embodiment, the network-bridge entity 200 is configured to transfer the MCX functionality to the electronic device 100 in the non-MCX zone by connecting the electronic device 100 in the non-MCX zone with the established MCX, receiving a request from the electronic device 100 to access floor or transmission control for media transmission with the MCX server 300, and notifying the electronic device 100 of at least one access response from the MCX.

Further, the network-bridge entity 200 is configured to receive the MCX UI from the MCX server 300 representing one of a flow of the MCX and the MCX functionality. Further, the network-bridge entity 200 is configured to generate a virtual MCX UI simulating the MCX UI received from the MCX server 300. Further, the network-bridge entity 200 is configured to transfer the virtual MCX UI to the electronic device 100. The details related to the transferring of the virtual MCX UI to the electronic device 100 are explained in FIGS. 6A, 6B, 7A, and 7B.

In an embodiment, the virtual MCX UI is transferred by the network-bridge entity 200 to the electronic device 100 using one of the VoLTE communication request, the ViLTE communication request, the VoNR communication request, the VoWiFi communication request, the and VoPS communication request.

In an embodiment, the network-bridge entity 200 authenticates the electronic device 100 based on at least one of biometric data and access token of a user of the electronic device 100 before establishing the communication with the MCX server 300. The details related to the authentication are explained in FIGS. 9A and 9B. In an embodiment, the access token stored in the electronic device 100 was fetched from the MCX server 300, when the electronic device 100 had been in the MCX zone.

Although FIG. 3 shows various hardware components of the system 1000a but it is to be understood that the embodiments are not limited thereon. In some embodiments, the system 1000a may include a greater or smaller number of components. Further, the labels or names of the components are used only for illustrative purpose and does not limit the scope of the disclosure. One or more components can be combined together to perform the same or substantially similar function to provide the MCX in the wireless communication network.

Figure 4:
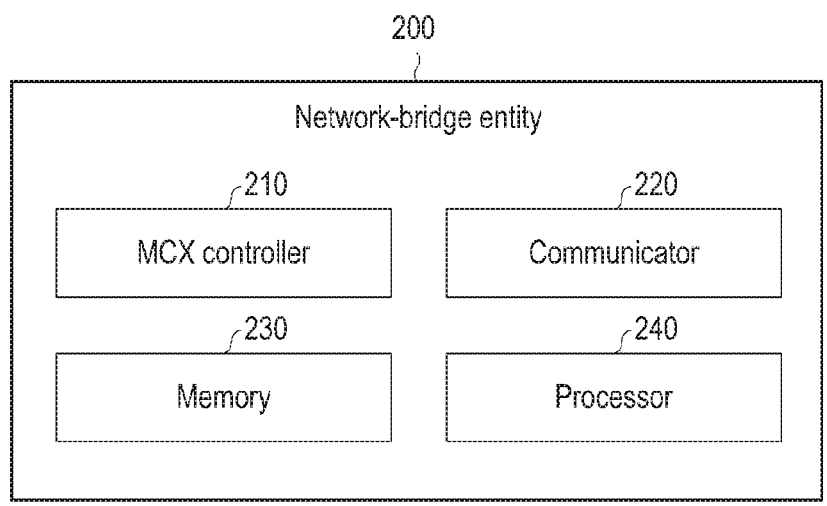
FIG. 4 illustrates a block diagram of a network-bridge entity, according to an embodiment.

FIG. 4 illustrates a block diagram of the network-bridge entity 200, according to an embodiment. In an embodiment, the network-bridge entity 200 includes an MCX controller 210, a communicator 220, a memory 230, and a processor 240. The MCX controller 210 may be implemented by one or more processors. In an embodiment, the MCX controller 210 is configured to receive the communication request from the electronic device 100 in the non-MCX zone. Based on the communication request, the MCX controller 210 is configured to perform the registration of the electronic device 100 with the MCX server 300 present in the MCX zone. Based on the registration, the MCX controller 210 is configured to establish the MCX with the MCX server 300. After establishing the MCX, the MCX controller 210 is configured to transfer the MCX functionality to the electronic device 100 in the non-MCX zone.

In an embodiment, the MCX controller 210 is configured to transfer the MCX functionality to the electronic device 100 in the non-MCX zone by connecting the electronic device 100 in the non-MCX zone with the established MCX, receiving the request from the electronic device 100 to access floor or transmission control for media transmission with the MCX server 300, and notifying the electronic device 100 of at least one access response from the MCX.

Further, the MCX controller 210 is configured to receive the MCX UI from the MCX server 300 representing one of the flow of the MCX and the MCX functionality. Further, the MCX controller 210 is configured to generate the virtual MCX UI simulating the MCX UI received from the MCX server 300. Further, the MCX controller 210 is configured to transfer the virtual MCX UI to the electronic device 100.

In an embodiment, the MCX controller 210 authenticates the electronic device based on at least one of biometric data and access token of the user of the electronic device 100 before establishing the communication with the MCX server 300. In an embodiment, the access token stored in the electronic device 100 was fetched from the MCX server 300, when the electronic device 100 had been in the MCX zone.

The communicator 220 is configured for communicating internally between internal hardware components and/or communicating with external devices via one or more networks. The communicator 220 is configured for communicating with the MCX controller 210 to provide the MCX in the wireless communication network. In an embodiment, the MCX controller 210 includes a registration module, an MCX functionality transferring module, an access response notification module, and/or a virtual MCX UI simulating module for handling the MCX in the wireless communication network.

Further, the processor 240 is configured to execute instructions stored in the memory 230 and perform various processes. The memory 230 also stores instructions to be executed by the processor 240. The memory 230 may include non-volatile storage elements. Examples of such non-volatile storage elements may include magnetic hard disks, optical discs, floppy disks, flash memories, or forms of electrically programmable read-only memories (EPROMs) or electrically erasable and programmable read-only memories (EEPROMs). In addition, the memory 230 may, in some examples, be considered a non-transitory storage medium. The term "non-transitory" may indicate that the storage medium is not embodied in a carrier wave or a propagated signal. However, the term "non-transitory" should not be interpreted to imply that the memory is non-movable. In some examples, the memory 230 can be configured to store larger amounts of information than the memory. In certain examples, a non-transitory storage medium may store data that can, over time, change (e.g., in random access memory (RAM) or cache).

Although FIG. 4 shows various hardware components of the network-bridge entity 200, it is to be understood that the embodiments are not limited thereon. In some embodiments, the network-bridge entity 200 may include a greater or smaller number of components. Further, the labels or names of the components are used only for illustrative purpose and does not limit the scope of the disclosure. One or more components can be combined together to perform the same or substantially similar function to provide the MCX in the wireless communication network.

Figure 5:
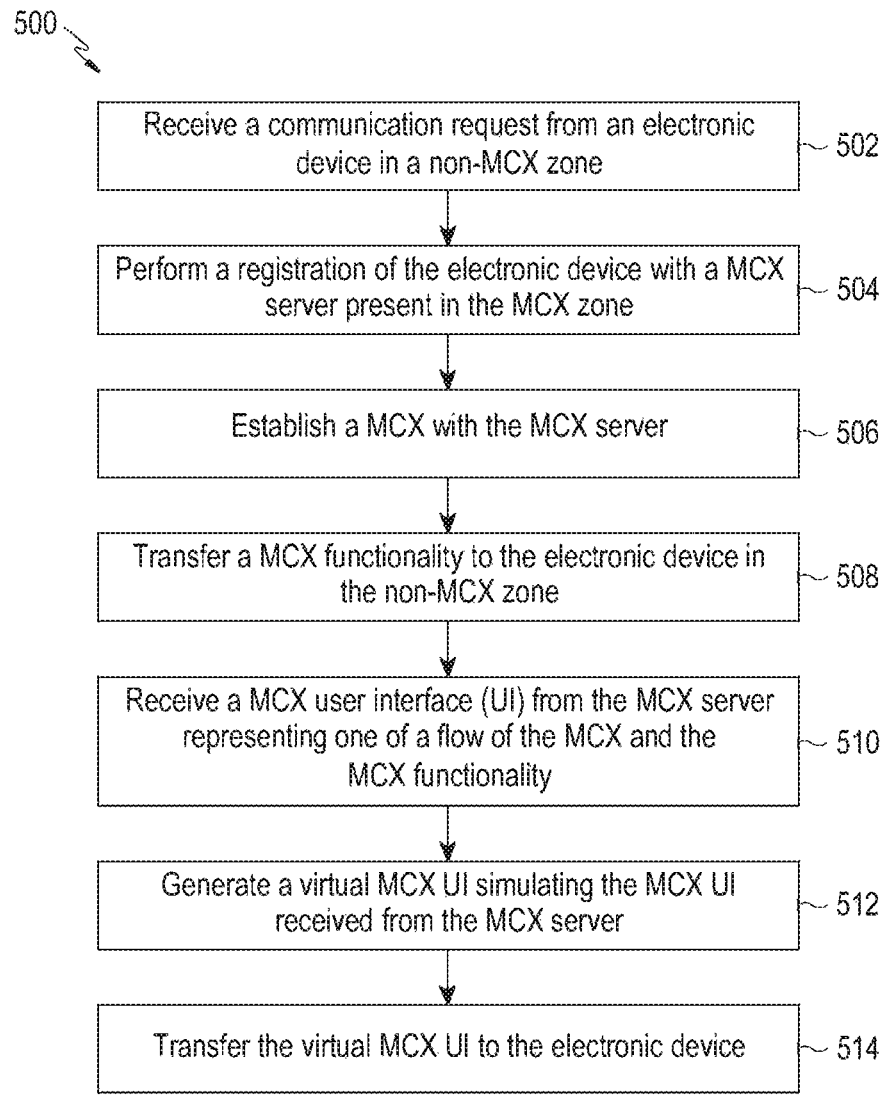
FIG. 5 illustrates a flow diagram of a method for providing the MCX in the wireless communication network, according to an embodiment.

FIG. 5 illustrates a flow diagram 500 of a method for providing MCX in the wireless communication network, according to an embodiment. The operations 502-514 may be performed by the MCX controller 210.

At operation 502, the communication request may be received from the electronic device 100 in the non-MCX zone. At operation 504, the registration of the electronic device 100 with the MCX server 300 present in the MCX zone may be performed. At operation 506, the MCX may be established with the MCX server 300. At operation 508, the MCX functionality may be transferred to the electronic device 100 in the non-MCX zone.

At operation 510, the MCX UI may be received from the MCX server 300 representing one of the flow of the MCX and the MCX functionality. At operation 512, the virtual MCX UI may be generated, where the virtual MCX UI simulates the MCX UI received from the MCX server 300. At operation 514, the virtual MCX UI may be transferred to the electronic device 100.

The various actions, acts, blocks, steps, or the like in the flow diagram 500 may be performed in the order presented, in a different order or simultaneously. Further, in some embodiments, some of the actions, acts, blocks, steps, or the like may be omitted, added, modified, skipped, or the like without departing from the scope of the disclosure.

Figure 6A:
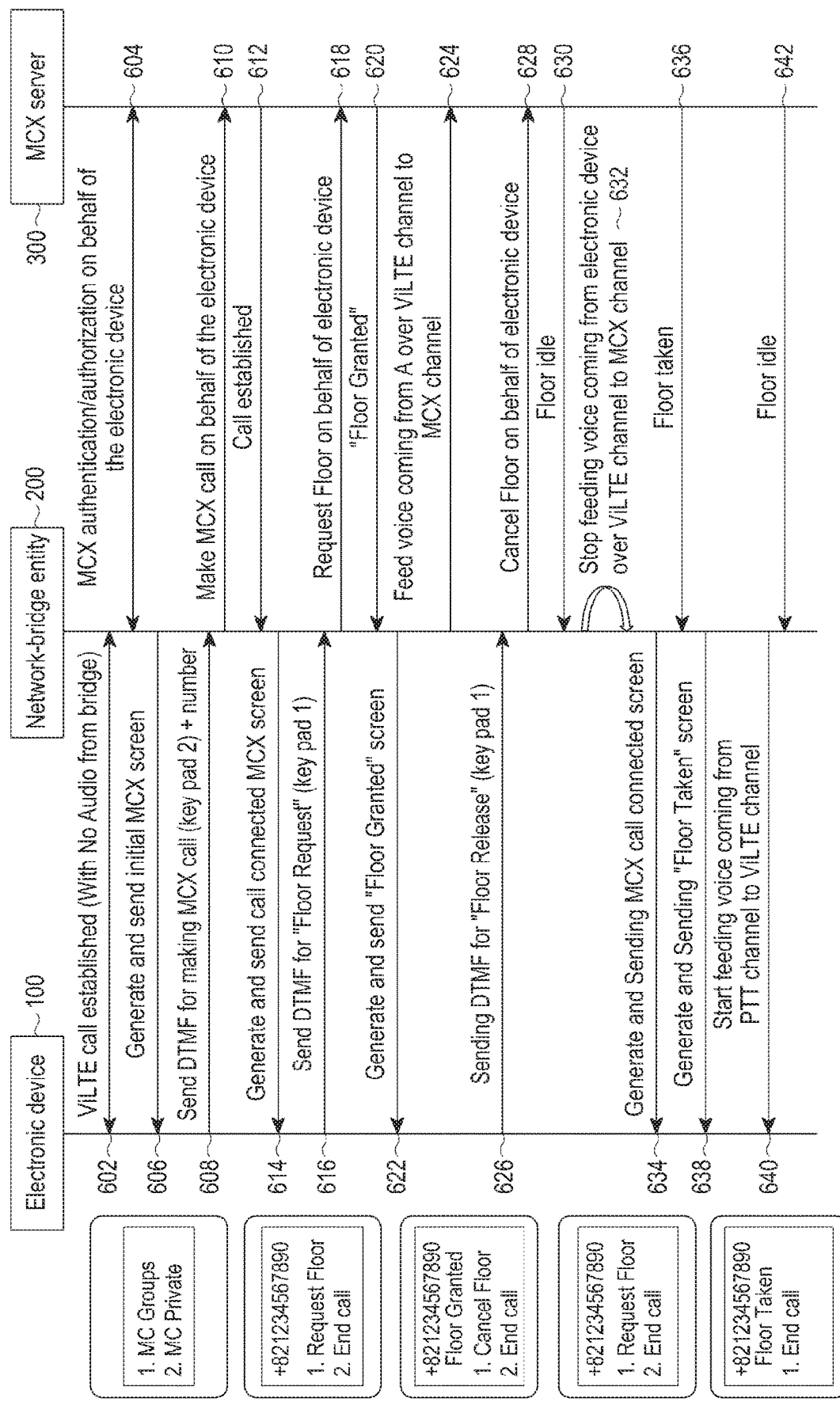
FIGS. 6A, 6B, 7A, 7B, and 8 illustrate example sequence diagrams illustrating various operation for providing MCX in the wireless communication network, according to an embodiment.
Figure 6B:
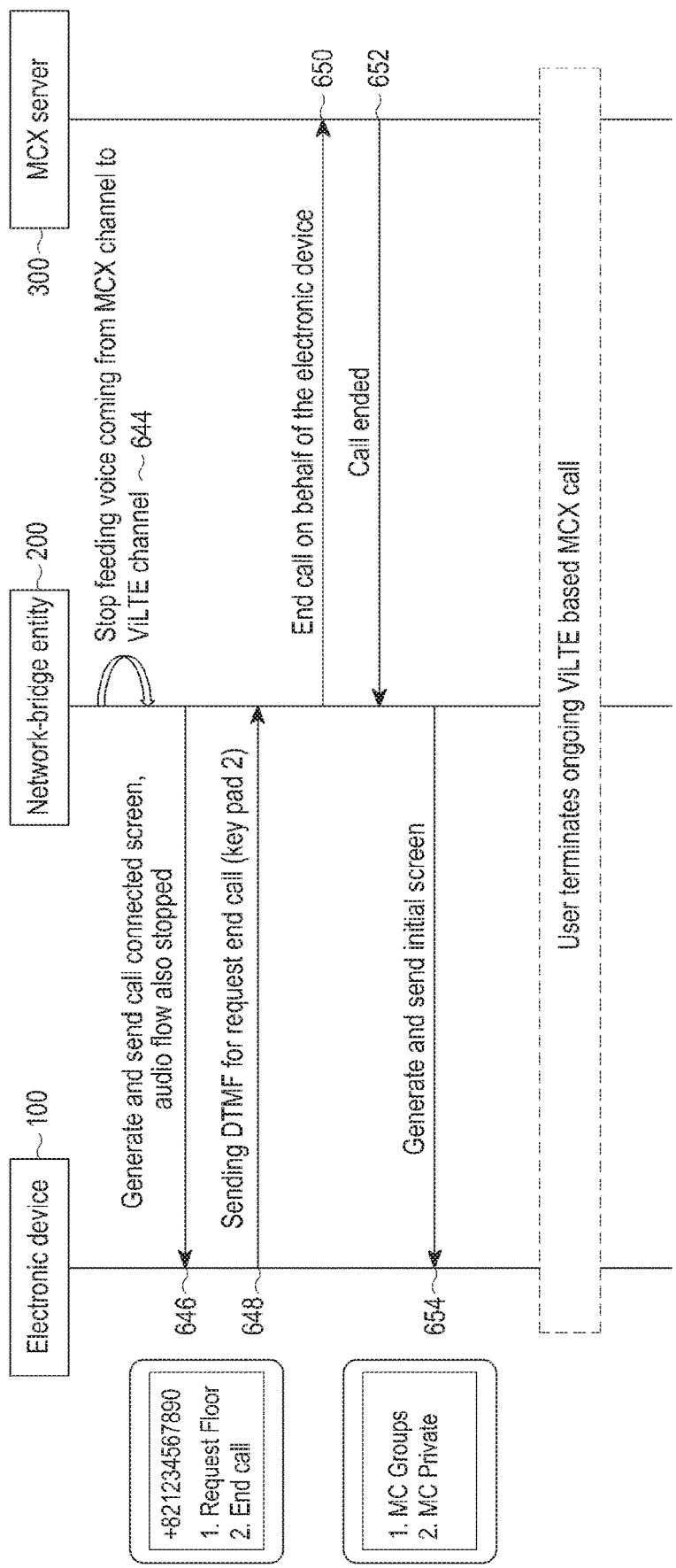
Figure 7A:
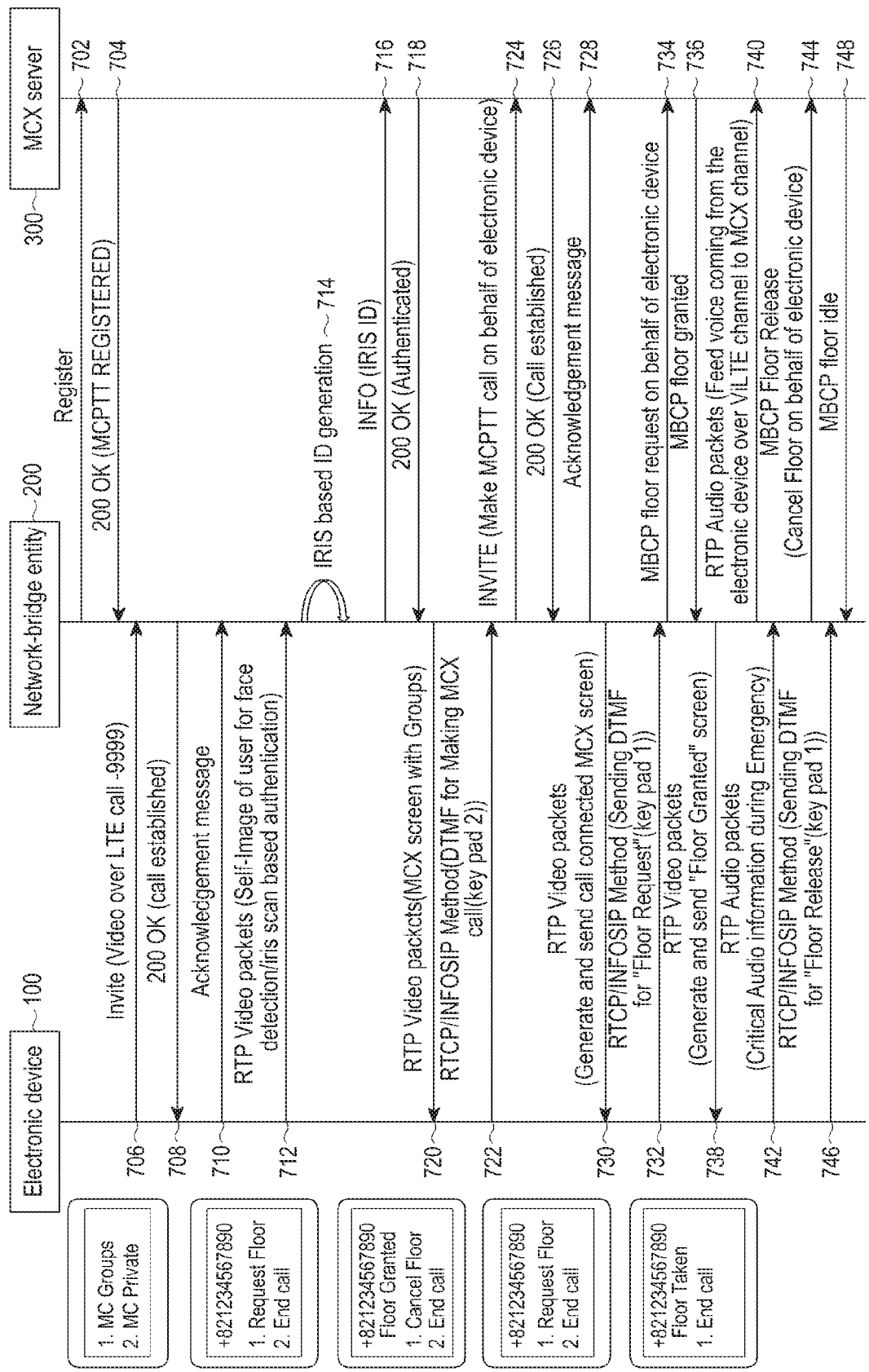
Figure 7B:
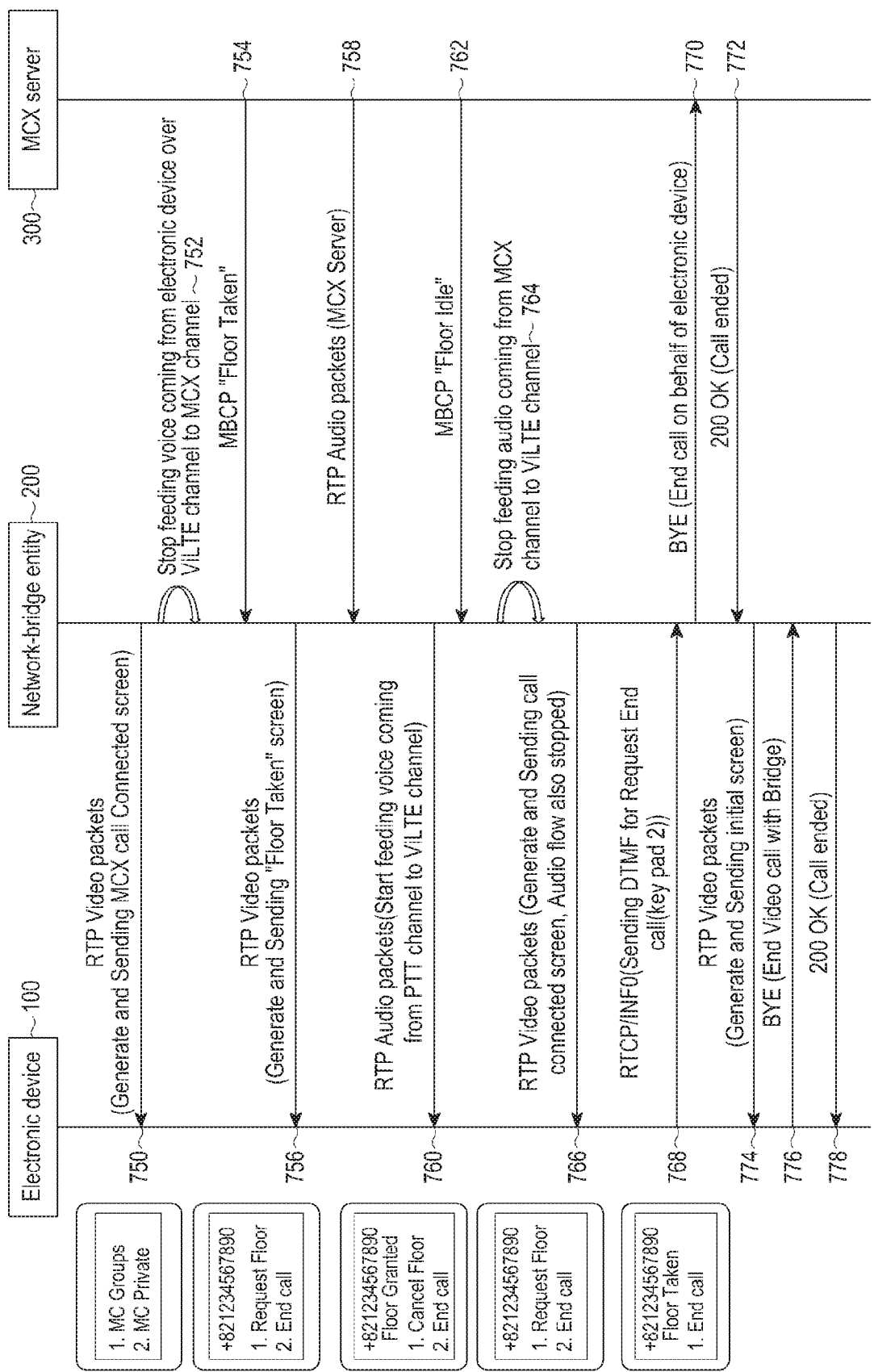

FIGS. 6A, 6B, 7A, 7B, and 8 are example sequence diagrams illustrating various operation for providing the MCX in the wireless communication network, according to an embodiment. The sequence diagram shown in FIG. 6B is a continuation of the sequence diagram shown in FIG. 6A. Similarly, the sequence diagram shown in FIG. 7B is a continuation of the sequence diagram shown in FIG. 7A. In these examples, the electronic device 100 may be located in the non-MCX zone while the MCX server 300 may be present in the MCX zone.

As shown in FIG. 6A, at operation 602, the ViLTE call is established without audio between the electronic device 100 and the network-bridge entity 200. At operation 604, the MCX authentication/authorization on behalf of the electronic device 100 is performed between the network-bridge entity 200 and the MCX server 300.

At operation 606, the network-bridge entity 200 generates and sends an initial MCX screen to the electronic device 100. At operation 608, the electronic device 100 sends a dual-tone multi-frequency (DTMF) signal for making the MCX call. At operation 610, the network-bridge entity 200 makes the MCX call on behalf of the electronic device 100 to the MCX server 300. At operation 612, the MCX call is established between the network-bridge entity 200 and the MCX server 300.

At operation 614, the network-bridge entity 200 generates and sends a call connected MCX screen to the electronic device 100. At operation 616, the electronic device 100 sends the DTMF for the floor request, using a key pad 1, to the network-bridge entity 200. At 618, the electronic device 100 sends the floor request on behalf of the electronic device 100 to the MCX server. At 620, the MCX server 300 sends a floor granted message to the network-bridge entity 200. At 622, the network-bridge entity 200 generates and sends the floor granted screen to the electronic device 100. At 624, the network-bridge entity 200 feeds the voice coming from electronic device 100 over a ViLTE channel to an MCX channel.

At operation 626, the electronic device 100 sends the DTMF for floor release using the key pad 1 to the network-bridge entity 200. At operation 628, the network-bridge entity 200 sends a cancel floor request on behalf of the electronic device 100 to the MCX server 300. At operation 630, the MCX server 300 sends the floor idle request to the network-bridge entity 200. At operation 632, the network-bridge entity 200 stops feeding voice coming from the electronic device to the MCX server over the ViLTE channel to the MCX channel.

At operation 634, the network-bridge entity 200 generates and sends the MCX call connected screen to the electronic device 100. At operation 636, the MCX server 300 sends the "floor taken" message to the network-bridge entity 200. At operation 638, the network-bridge entity 200 generates and sends the floor taken screen to the electronic device 100. At operation 640, the network-bridge entity 200 starts feeding voice coming from a PTT channel to the ViLTE channel. At operation 642, the MCX server 300 sends the floor idle message to the network-bridge entity 200.

As shown in FIG. 6B, which is a continuation of FIG. 6A, at operation 644, the network-bridge entity 200 stops feeding voice coming from the MCX channel to the ViLTE channel. At operation 646, the network-bridge entity 200 generates and sends a call connected screen to the electronic device 100 and an audio flow is stopped between the network-bridge entity 200 and the electronic device 100.

At operation 648, the electronic device 100 sends the DTMF for request end call using the key pad 2 to the network-bridge entity 200. At operation 650, the network-bridge entity 200 sends the end call on behalf of electronic device 100. At operation 652, the MCX server 300 sends the "call ended" message to the network-bridge entity 200. At operation 654, the network-bridge entity 200 generates and sends the initial screen.

In order to understand the concept of handling the MCX in the wireless communication network, the example is illustrated in the context of ViLTE. However, there is no difference with respect to IMS flows for realizing the solution in the VoNR call, the VoLTE call, or the VoWiFi call and hence same technical details can be generically used across the radio access technologies.

As shown in FIG. 7A, at operation 702, the network-bridge entity 200 registers with the MCX server 300. Based on the registration, the MCX server 300 sends the acknowledgment message to the network-bridge entity 200 at operation 704. At operation 706, the electronic device 100 sends an invite message (e.g., video over LTE call by adding predefined number 9999) to the network-bridge entity 200. Based on the invite message, the network-bridge entity 200 sends a call establishment message to the electronic device 100 at operation 708. Based on the call establishment message, the electronic device 100 sends the acknowledgment message to the network-bridge entity 200 at operation 710.

At operation 712, the electronic device 100 sends real-time transport protocol (RTP) video packets to the network-bridge entity 200 using a self-image of the user for face detection/iris scan based authentication. At operation 714, the network-bridge entity 200 performs an iris-based ID generation, and at operation 716, the network-bridge entity 200 sends the iris information to the MCX server 300. Based on the iris information, the MCX server 300 sends an authentication message to the network-bridge entity 200 at operation 718.

At operation 720, the network-bridge entity 200 sends the RTP video packets representing the MCX screen with groups to the electronic device 100. At operation 722, the electronic device 100 sends a RTCP/INFOSIP procedure (i.e., DTMF for making MCX call using the key pad 2) to the network-bridge entity 200. At operation 724, the network-bridge entity 200 sends an invite to make a mission critical push to talk (MCPTT) call on behalf of the electronic device 100 to the MCX server 300. At operation 726, the call is established between the network-bridge entity 200 and the MCX server 300.

At operation 728, the network-bridge entity 200 sends the acknowledgement message to the MCX server 300. At operation 730, the network-bridge entity 200 sends the RTP video packets (for generating and sending call connected MCX screen) to the electronic device 100. At operation 732, the electronic device 100 sends the RTCP/INFOSIP procedure (for sending DTMF for the floor request using the key pad 1) to the network-bridge entity 200.

At operation 734, the network-bridge entity 200 sends a media burst control protocol (MBCP) floor request to the MCX server 300. At operation 736, the MCX server 300 sends the MBCP "floor granted" message to the network-bridge entity 200. At operation 738, the network-bridge entity 200 sends the RTP Video packets for generating and sending floor granted screen to the electronic device 100. At operation 740, the network-bridge entity 200 sends the RTP audio packets, for feeding the voice over the ViLTE channel to the MCX channel, to the MCX server 300.

At operation 742, the electronic device 100 sends the RTP audio packets for critical audio information during emergency to the network-bridge entity 200. At operation 744, the network-bridge entity 200 sends the MBCP floor release on behalf of electronic device 100 to the MCX server 300.

At operation 746, the electronic device 100 performs the RTCP/INFOSIP procedure for sending DTMF for floor release to the network-bridge entity 200. The MCX server 300 sends the MBCP "floor idle" message to the network-bridge entity 200 at 748.

As shown in FIG. 7B, which continues from FIG. 7A, at operation 750, the network-bridge entity 200 sends the RTP video packets for generating and sending the MCX call connected screen to the electronic device 100. At operation 752, the network-bridge entity 200 stops the feeding voice coming from electronic device to the MCX server 300 over the ViLTE channel to the MCX channel.

At operation 754, the MCX server sends the MBCP "floor taken" message to the network-bridge entity 200. At operation 756, the network-bridge entity 200 sends the RTP video packets for generating and sending a "floor taken" screen to the electronic device 100. At operation 758, the MCX server 300 sends the RTP audio packets to the network-bridge entity 200.

At operation 760, the network-bridge entity 200 sends the RTP audio packets to the electronic device 100. The MCX server 300 sends the MBCP floor idle message to the network-bridge entity 200 at operation 762.

At operation 764, the network-bridge entity 200 stops feeding audio coming from the MCX channel to the ViLTE channel. At operation 766, the network-bridge entity 200 sends the RTP video packets (for generating and sending call connected screen) to the electronic device 100. The audio flow is stopped between the network-bridge entity 200 and the electronic device 100.

At operation 766, the electronic device 100 sends the DTMF for request "end call" to the network-bridge entity 200. At operation 768, the network-bridge entity 200 stops the call on behalf of electronic device 100. At operation 770, the MCX server 300 sends the "call ended" message to the network-bridge entity 200. At operation 774, the network-bridge entity 200 sends the RTP Video packets for generating and sending initial screen to the electronic device 100. At operations 776 and 778, the video call is terminated between the network-bridge entity 200 and the electronic device 100.

Figure 8:
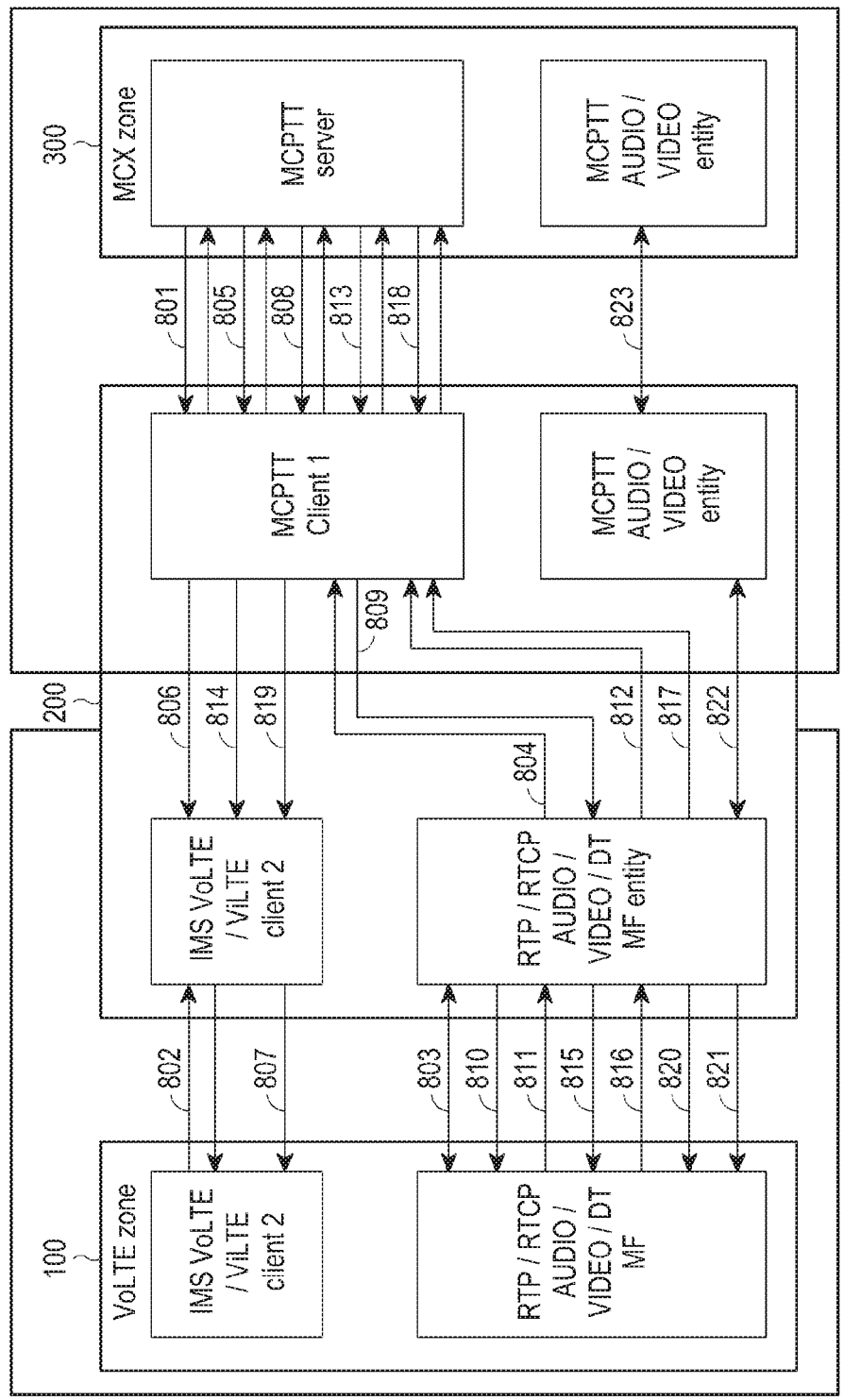

As shown in FIG. 8, the network-bridge entity 200 authenticate the non-MCX user using iris, fingerprint, password, etc. via the video transmitted or DTMFs of password over media plane obtained at the network-bridge entity as illustrated as operations 2 through 7. The network-bridge entity 200 registers with the MCX server 300 on behalf of the non-MCX user after authentication as illustrated in operations 8 through 10.

Further, the network-bridge entity 200 provides the MCX functionality options to the non-MCX user after registration as illustrated in operations 11 through 20. The network-bridge entity 200 channels the media from ViLTE call to the MCX session through the media pass through channel by routing the media packets to the MCX server 300 as illustrated in operations 21 through 23.

As shown in FIG. 8, at operation 801, the first MCPTT client included in the network-bridge entity 200 registers with the MCPTT server 300. At operation 802, the call connection is established between a first IMS VoLTE/ViLTE client included in the electronic device 100 and a second IMS VoLTE/ViLTE client present in the network-bridge entity 200.

At operation 803, audio/video (A/V) data is established between the RTP/RTCP AUDIO/VIDEO DTMF entity included in the first electronic device 100 and the RTP/RTCP AUDIO/VIDEO DTMF entity included in the network-bridge entity 200.

At operation 804, the RTP/RTCP AUDIO/VIDEO DTMF entity included in the network-bridge entity 200 sends the AUTH DATA to the first MCPTT client present in the network-bridge entity 200. At operation 805, the first MCPTT client included in the network-bridge entity 200 sends the AUTH REQ to the MCPTT server 300.

At operation 806, the first MCPTT client 100 included in the network-bridge entity 200 sends the authentication success message to the second IMS VoLTE/ViLTE client included in the network-bridge entity 200. At operation 807, the second IMS VoLTE/ViLTE client included in the network-bridge entity 200 sends the authentication success message to the first IMS VoLTE/ViLTE client included in the electronic device 100.

At operation 808, the first MCPTT client included in the network-bridge entity 200 sends fetch groups information to the MCPTT server 300. At operation 809, the first MCPTT client included in the network-bridge entity 200 sends group data image information to the RTP/RTCP AUDIO/VIDEO DTMF entity included in the network-bridge entity 200.

At operation 810, the RTP/RTCP AUDIO/VIDEO DTMF entity included in the network-bridge entity 200 sends the group data to the RTP/RTCP AUDIO/VIDEO DTMF entity included in the electronic device 100.

At operation 811, the RTP/RTCP AUDIO/VIDEO DTMF entity included in the electronic device 100 joins the group to the RTP/RTCP AUDIO/VIDEO DTMF entity included in the network-bridge entity 200.

At operation 812, the RTP/RTCP AUDIO/VIDEO DTMF entity included in the network-bridge entity 200 sends the join group request to the first MCPTT client included in the network-bridge entity 200. At operation 813, the MCX call is established between the first MCPTT client included in the network-bridge entity 200 and the server 300.

At operation 814, the first MCPTT client included in the network-bridge entity 200 sends the "call success" message to the second IMS VoLTE/ViLTE Client included in the network-bridge entity 200. At operation 815, the RTP/RTCP AUDIO/VIDEO DTMF entity included in the network-bridge entity 200 sends the call success information to the RTP/RTCP AUDIO/VIDEO DTMF entity included in the electronic device 100.

At operation 816, RTP/RTCP AUDIO/VIDEO DTMF entity included in the electronic device 100 sends the floor request to the RTP/RTCP AUDIO/VIDEO DTMF entity included in the network-bridge entity 200. At operation 817, the RTP/RTCP AUDIO/VIDEO DTMF entity included in the network-bridge entity 200 sends the floor request to the first MCPTT Client included in the network-bridge entity 200.

At operation 818, the first MCPTT client included in the network-bridge entity 200 sends the floor request to the MCPTT server 300. At operation 819, the MCPTT client sends the "floor granted" message to the IMS VoLTE/ViLTE Client 2 included in the network-bridge entity 200.

At operation 820, the RTP/RTCP AUDIO/VIDEO DTMF included in the network-bridge entity 200 sends the "floor granted" message to the RTP/RTCP AUDIO/VIDEO DTMF entity included in the electronic device 100. At operation 821, A/V data is established between the RTP/RTCP AUDIO/VIDEO DTMF included in the network-bridge entity 200 and the RTP/RTCP AUDIO/VIDEO DTMF included in the electronic device.

At operation 822, A/V data is established between RTP/RTCP AUDIO/VIDEO DTMF entity included in the network-bridge entity 200 and MCPTT AUDIO/VIDEO element presents in the network-bridge entity 200. At operation 823, A/V data is established between MCPTT AUDIO/VIDEO element included in the network-bridge entity 200 and MCPTT AUDIO/VIDEO server.

Figure 9A:
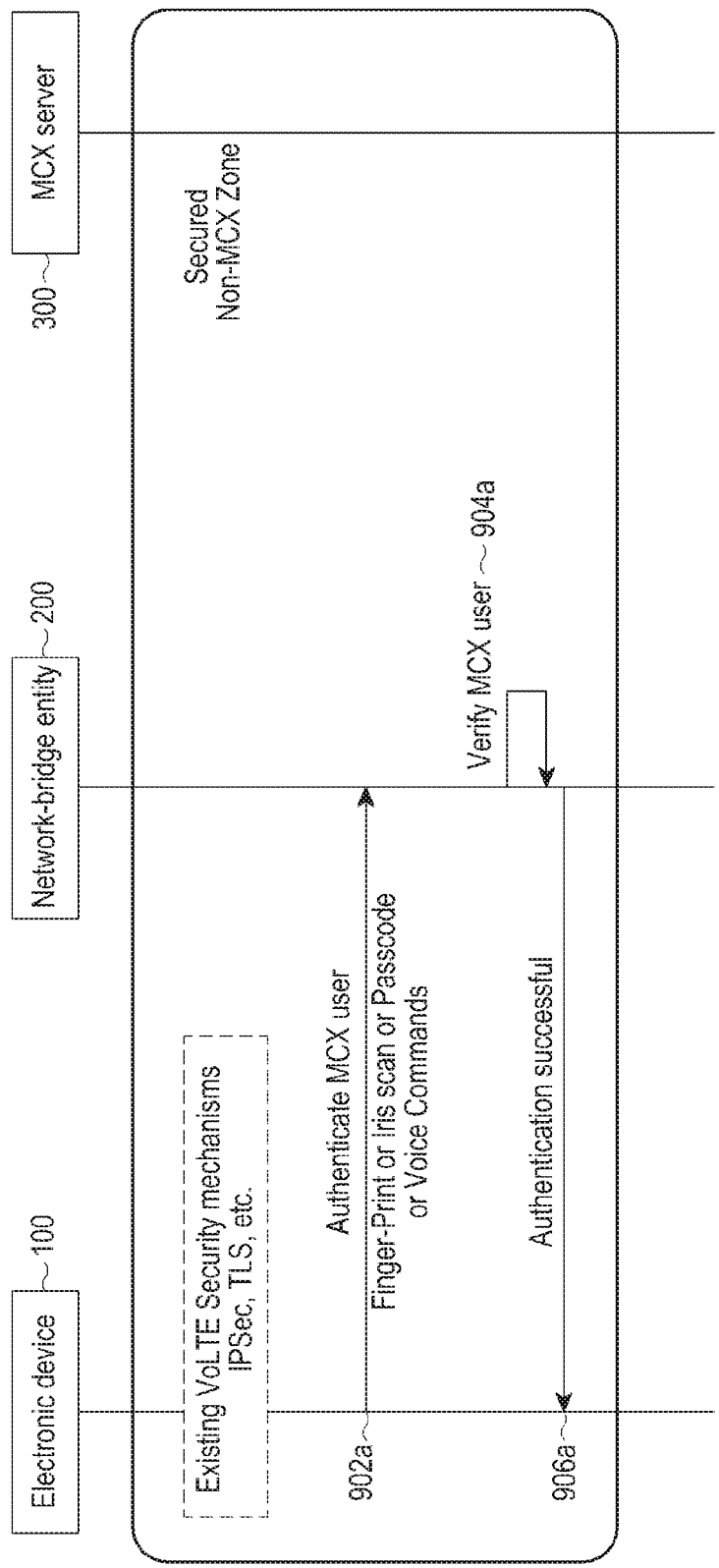
FIG. 9A and FIG. 9B illustrate example sequence diagrams illustrating various operations, implemented by the network-bridge entity, for authenticating the electronic device, according to an embodiment.
Figure 9B:
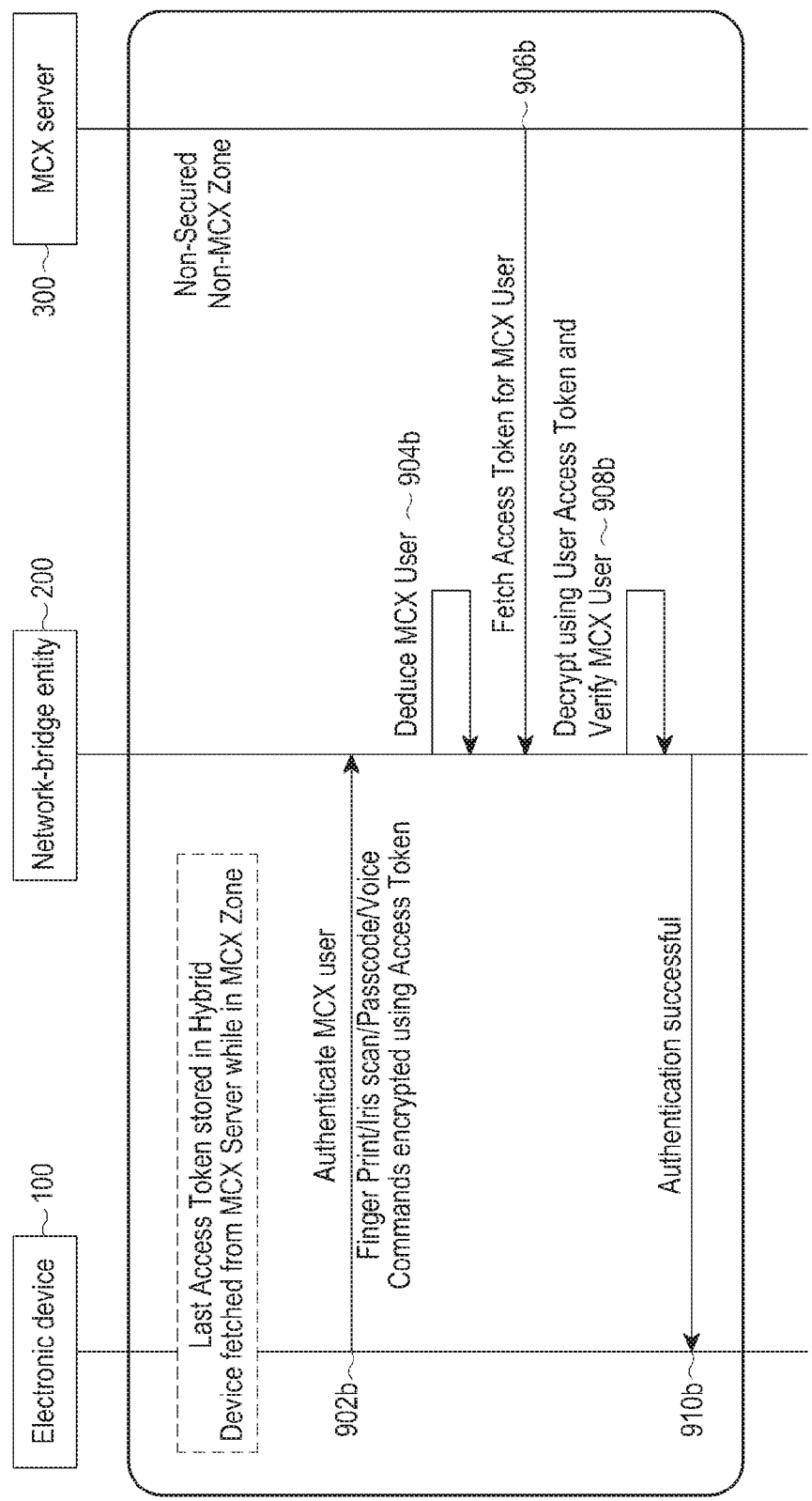

FIG. 9A and FIG. 9B illustrate example sequence diagrams illustrating various operations, implemented by the network-bridge entity 200, for authenticating the electronic device 100, according to an embodiment.

As shown in FIG. 9A, the electronic device 100 performs the authentication based on existing VoLTE security mechanisms, internet protocol security (IPSec), transport layer security (TLS), etc. At operation 902a, the electronic device 100 sends the authenticate request for the MCX user to the network-bridge entity 200 based on the finger-print, iris scan, passcode, or voice commands. The network-bridge entity 200 verifies the MCX user at operation 904a. Based on the authentication, the network-bridge entity 200 sends the authentication successful message to the electronic device at operation 906a.

As shown in FIG. 9B, the last access token stored in the hybrid electronic device fetched from the MCX server 300, while the electronic device 100 was in the MCX zone. At operation 902b, the electronic device 100 sends the authenticate request for the MCX user to the network-bridge entity 200 based on the finger-print, iris scan, passcode, or the voice commands encrypted using the access token.

At operation 904b, the network-bridge entity 200 deduces the MCX user via the MCX controller 210. At operation 906b, the network-bridge entity 200 fetches the access token for the MCX user. At operation 908b, the network-bridge entity 200 decrypts the using user access token and verifies the MCX user. Based on the authentication, the network-bridge entity 200 sends the authentication successful message to the electronic device 100 at operation 910b.

In general, the MCX user in the non-MCX zone should be able to make the ViLTE/VoLTE call to the predefined phone number (e.g. 9999) associated with the network-bridge entity 200 in the home LTE network and in turn reach out to the home MCX server. Access to the network-bridge entity 200 is available only after proper authentication using the fingerprint, iris scan, passcode, or voice commands. Further, the VoLTE security in the non-MCX zones is provided using existing security mechanisms like IPSec, TLS, etc. Further, the media data is secured using existing mechanisms like secure real-time transport protocol (SRTP), composed of Z and real-time transport protocol (ZRTP), etc.

Figure 10:
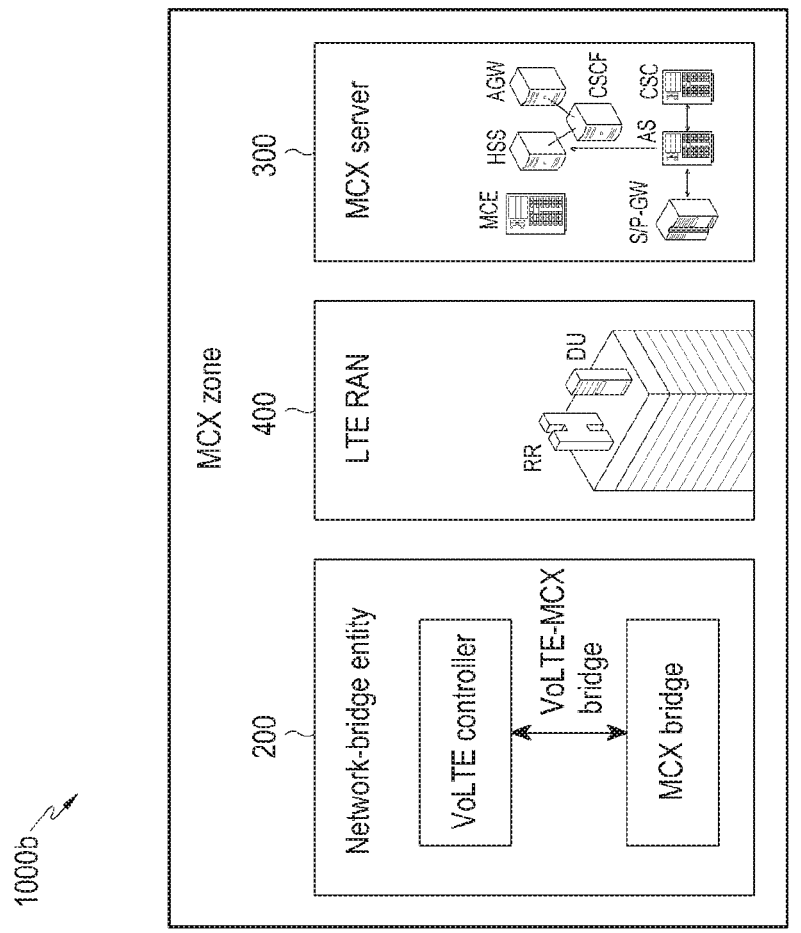
FIGS. 10 and 11 illustrate overviews of example systems for providing MCX in the wireless communication network, according to an embodiment.
Figure 10:
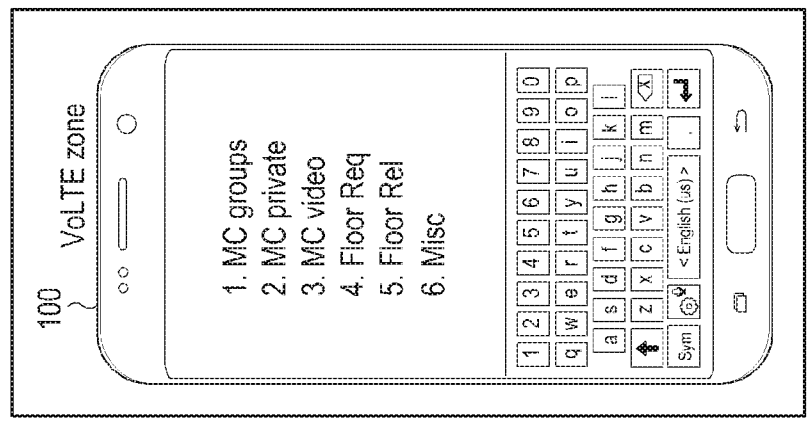
Figure 11:
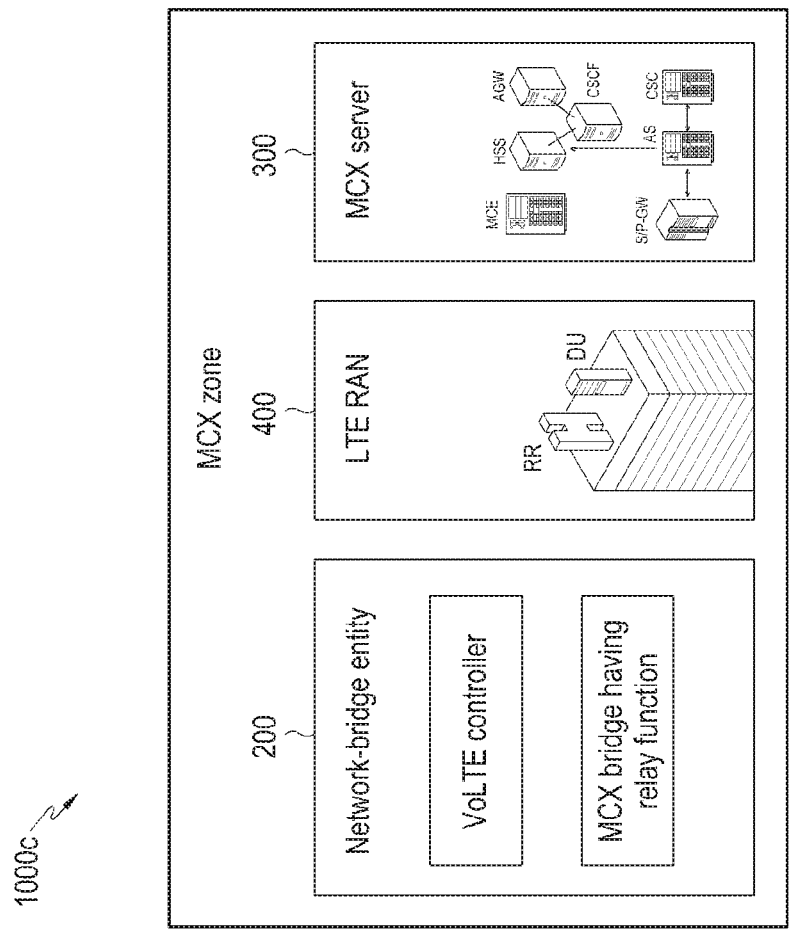
Figure 11:
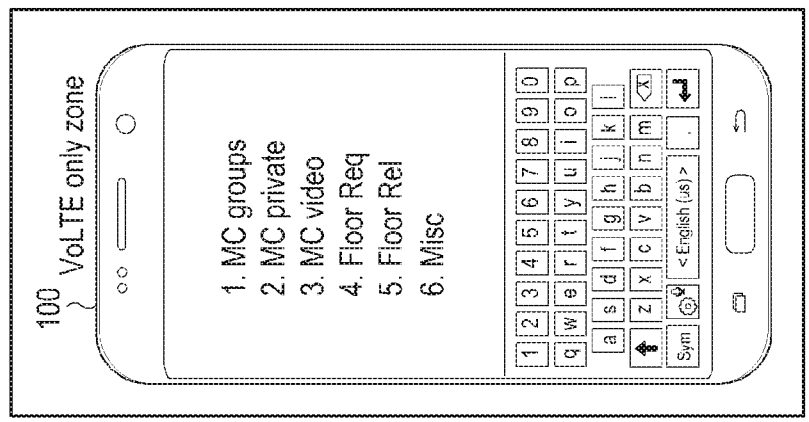

FIGS. 10 and 11 illustrate overviews of example systems 1000b and 1000c for providing MCX in the wireless communication network, according to an embodiment.

The operations and functions of the network-bridge entity 200 and the MCX server 300 will be explained in conjunction with FIGS. 3 to 10. For example, the user of the electronic device 100 may be present in the VoLTE zone and the MCX server 300 may be present in the MCX zone. The LTE radio access network (RAN) 400 communicates with the network-bridge entity 200 and the MCX server 300. Based on the proposed methods, the network-bridge entity 200 provides the bridge between a VoLTE function and an MCX function. The VoLTE function is handled by a VoLTE controller and the bridge function is handled by an MCX bridge.

As shown in FIG. 10, the reliability and quality of service are ensured through dedicated resource allocation by the network-bridge entity 200 on par with existing enhanced 911 (E911) procedures. The MCX user in the non-MCX zone makes the ViLTE/VoLTE call to reach out to the home MCX server 300 using the proposed methods. Users can also reach out through conventional calls to the MCX server 300 during the emergency scenarios.

As shown in FIG. 11, the user of the electronic device 100 may be present in the VoLTE zone and the MCX server 300 may be present in the MCX zone. The LTE RAN 400 may communicate with the network-bridge entity 200 (e.g., relay device) and the MCX server 300. Based on the proposed methods, the network-bridge entity 200 provides the bridge between a VoLTE function and an MCX function. The relay device provides the MCXes to the MCX user in the non-MCX zone by acting as a relay service through VoLTE/ViLTE communications. The MCX Relay device may register with the MCX server 300 on behalf of the MCX user who is in the non-MCX zone. The MCX relay device prepares video frames similar to the MCX UI along with informative/interactive capabilities, so that the MCX user can access the MCX server 300 using the virtual UI. The MCX relay device handles the Media encryption/decryption procedure.

Figure 12:
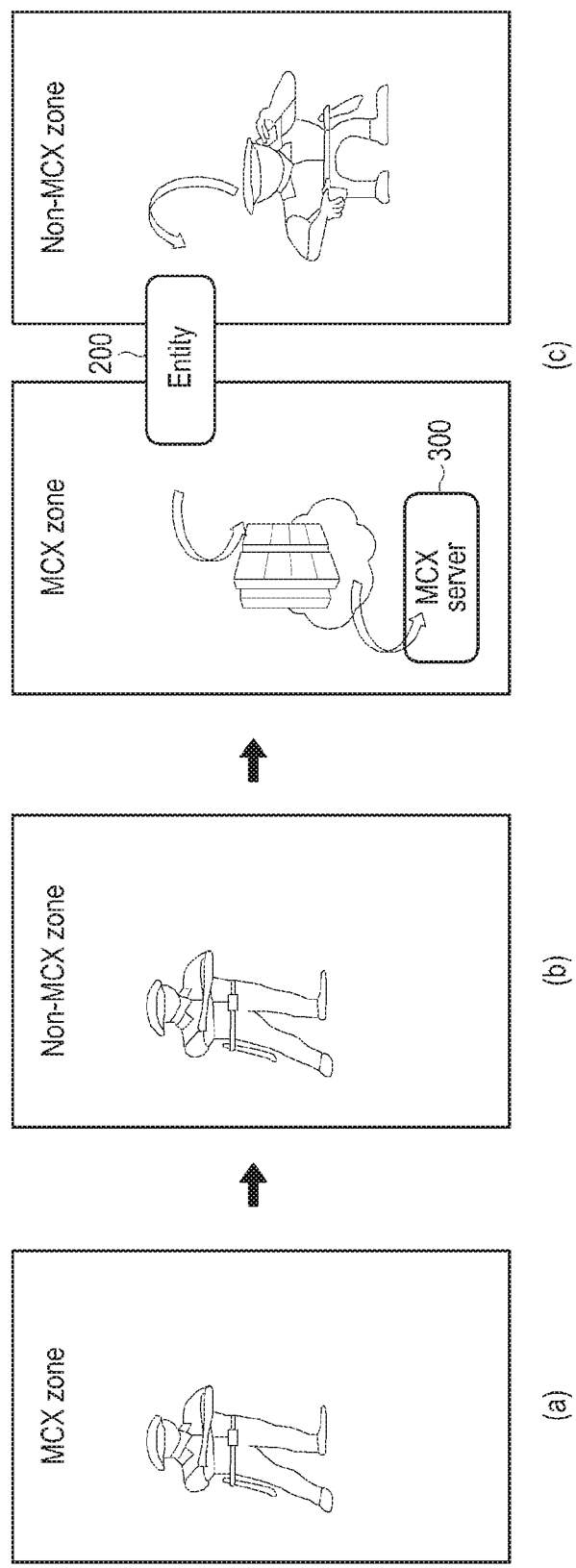
FIG. 12 illustrates an example scenario in which the system provides MCX in the wireless communication network using a hybrid MCX-VoLTE device, according to an embodiment.

FIG. 12 illustrates an example scenario in which the system 1000a provides the MCX in the wireless communication network using the hybrid MCX-VoLTE device, according to an embodiment. For example, the rescue team member moves to the non-MCX zone from the MCX zone as shown in notation "a" and notation "b" of FIG. 12, and critical emergency occurs in the non-MCX zone. Based on the proposed methods, the rescue team member can connect to the MCX server using the network-bridge entity 200 by making the ViLTE call as shown in notation "c" of FIG. 12.

Figure 13:
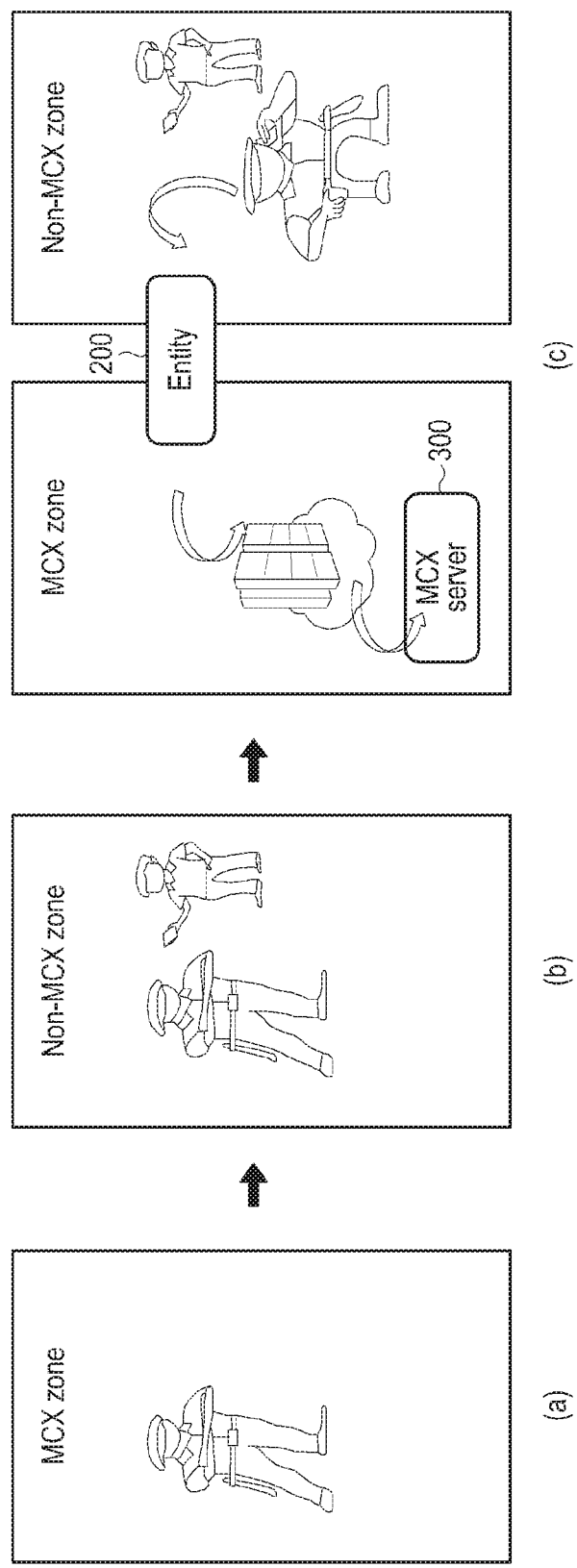
FIG. 13 illustrates an example scenario in which the system provides the MCX in the wireless communication network using a stand-alone MCX device, according to an embodiment.

FIG. 13 illustrates an example scenario in which the system 1000a provides the MCX in the wireless communication network using a stand-alone MCX device, according to an embodiment. Consider, the rescue team member moves to the non-MCX zone from the MCX zone and emergency situation occurs in the non-MCX zone as shown in notation "a" and notation "b" of FIG. 13. Based on the proposed methods, the rescue team member can connect to the MCX server 300 using the network-bridge entity 200 as shown in notation "c" of FIG. 13. The rescue team member takes VoLTE enabled device from a home network subscriber.

Figure 14:
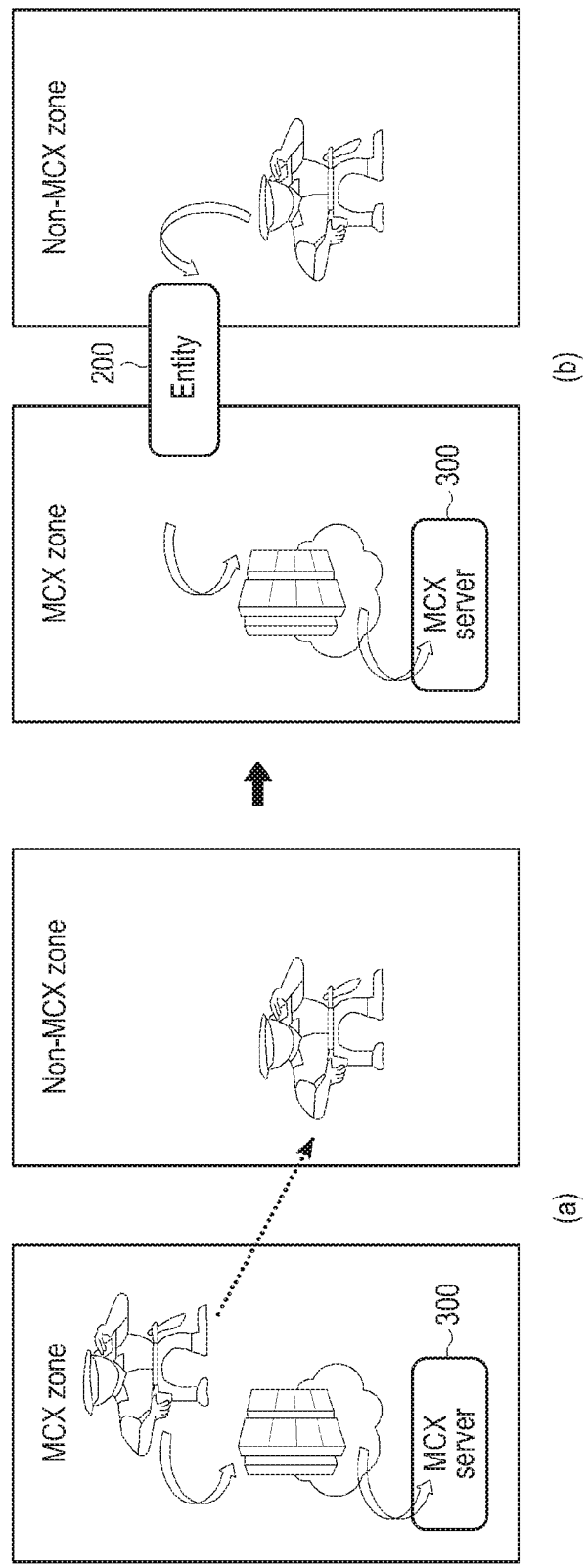
FIG. 14 illustrates an example scenario in which the system provides the MCX during a handover in the wireless communication network, according to an embodiment.

FIG. 14 illustrates an example scenario in which the system 1000a provides the MCX in the wireless communication network during a handover, according to an embodiment. The first responder moves from the MCX zone to the non-MCX zone, while the first responder is on the MCX call as shown in notation "a" of FIG. 14. Based on the proposed methods, the first responder can continue on the session transparently with the help of handover procedures along with the network-bridge entity 200 as shown in notation "b" of FIG. 14.

The details of the signaling procedures related to the handover procedures will be explained in conjunction with FIGS. 18 and 19.

Figure 15:
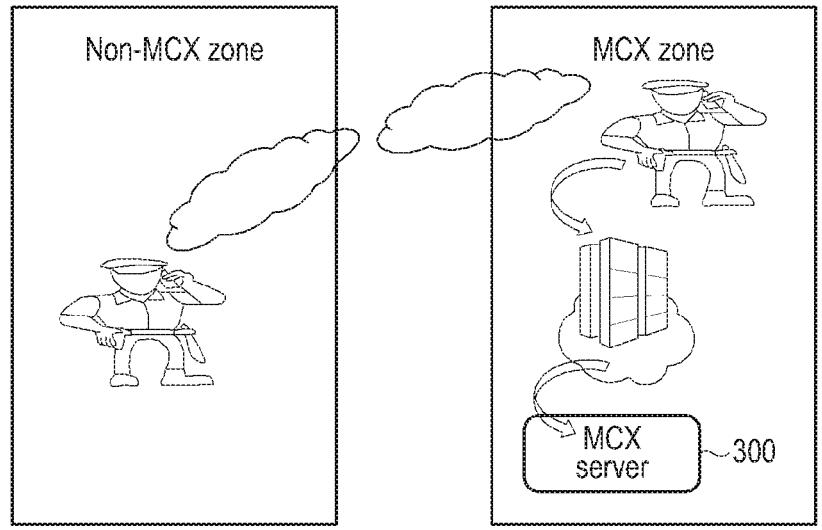
FIG. 15 illustrates an example scenario in which the system provides the MCX in the wireless communication network using the MCX-VoLTE relay, according to an embodiment.

FIG. 15 illustrates an example scenario in which the system 1000a provides the MCX in the wireless communication network using the MCX-VoLTE relay, according to an embodiment.

In an example, the rescue team member moves to the non-MCX zone from the MCX zone and the critical emergency occurs as shown in notation "a" of FIG. 14. Based on the proposed methods, the rescue team member can connect to the MCX server using the MCX Relay by making a ViLTE call to any other rescue team members in the MCX zone as shown in FIG. 15.

In an embodiment, the electronic device 100 may advertise its "Relay" capabilities within its session initiation protocol (SIP) message as part of headers or Multipart body like session description protocol (SDP), extensible markup language (XML), etc. or User Profile Configuration Provisioning using a hypertext transfer protocol (HTTP) protocol to notify the MCX server 300. This will make sure that only certain devices with relay capabilities are used for such procedures and will have dedicated channels to route calls through them transparently.

In another example, the rescue team member moves to the non-MCX zone from the MCX zone and the critical emergency occurs. This will require some additional enhancements on the hybrid device to be able to cater to the VoLTE-MCX bridging. Further, the user authentication data needs to be reliably transferred over a VoLTE channel using the RTCP/SRTP, etc. The details of the authentication sequence flow over the RCS during the Augmented MCX will be explained in conjunction with FIGS. 20, 21A and 21B.

Figure 16:
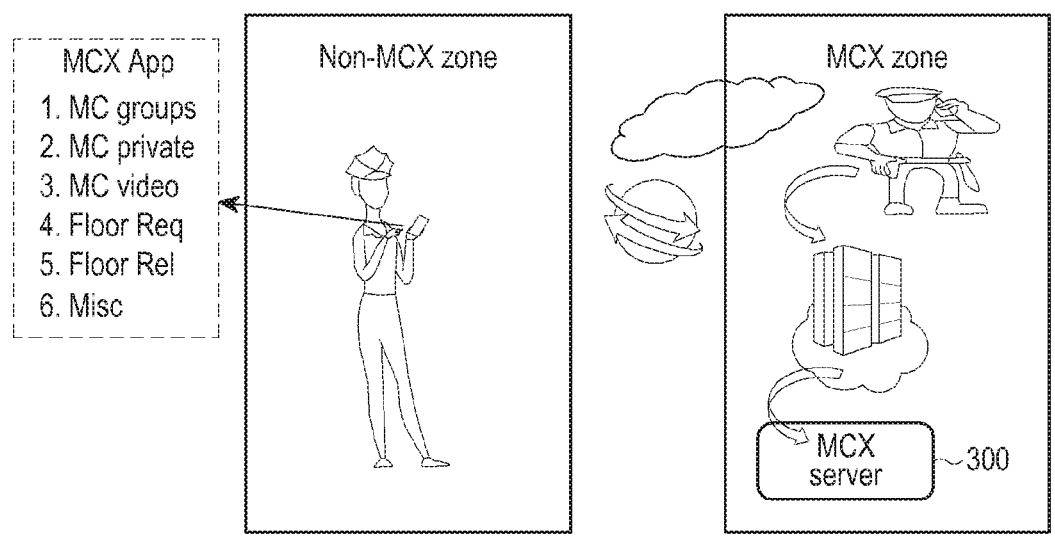
FIG. 16 illustrates an example scenario in which the system provides the MCX in the wireless communication network using an internet based MCX, according to an embodiment.

FIG. 16 illustrates an example scenario in which the system 1000a provides the MCX in the wireless communication network using an internet based MCX, according to an embodiment. The rescue team member moves to the non-MCX zone from the MCX zone. The critical emergency occurs in the non-MCX zone. Based on the proposed methods, the user of the electronic device 100 reaches out to the MCX server using an Internet-based MCX application on the electronic device 100.

Figure 17:
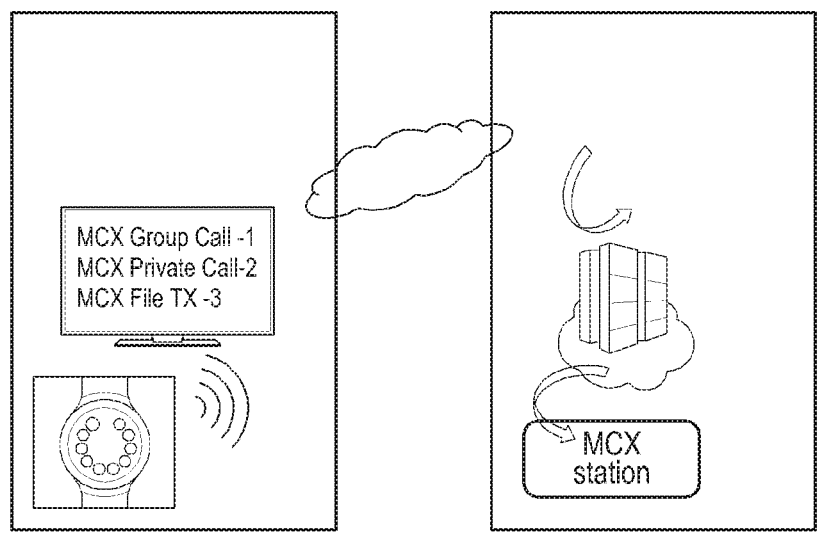
FIG. 17 illustrates an example scenario in which the system provides the MCX in the wireless communication network using a multi device MCX-VoLTE device, according to an embodiment.

FIG. 17 illustrates an example scenario in which the system 1000a provides the MCX in the wireless communication network using a multi device MCX-VoLTE device, according to an embodiment. The wearable devices could be utilized in tandem with smart TVs that can be used to view the MCX display while interacting with MC-server 100 based on the proposed method. This results in ease of use and access on the move during the critical emergency condition.

Figure 18:
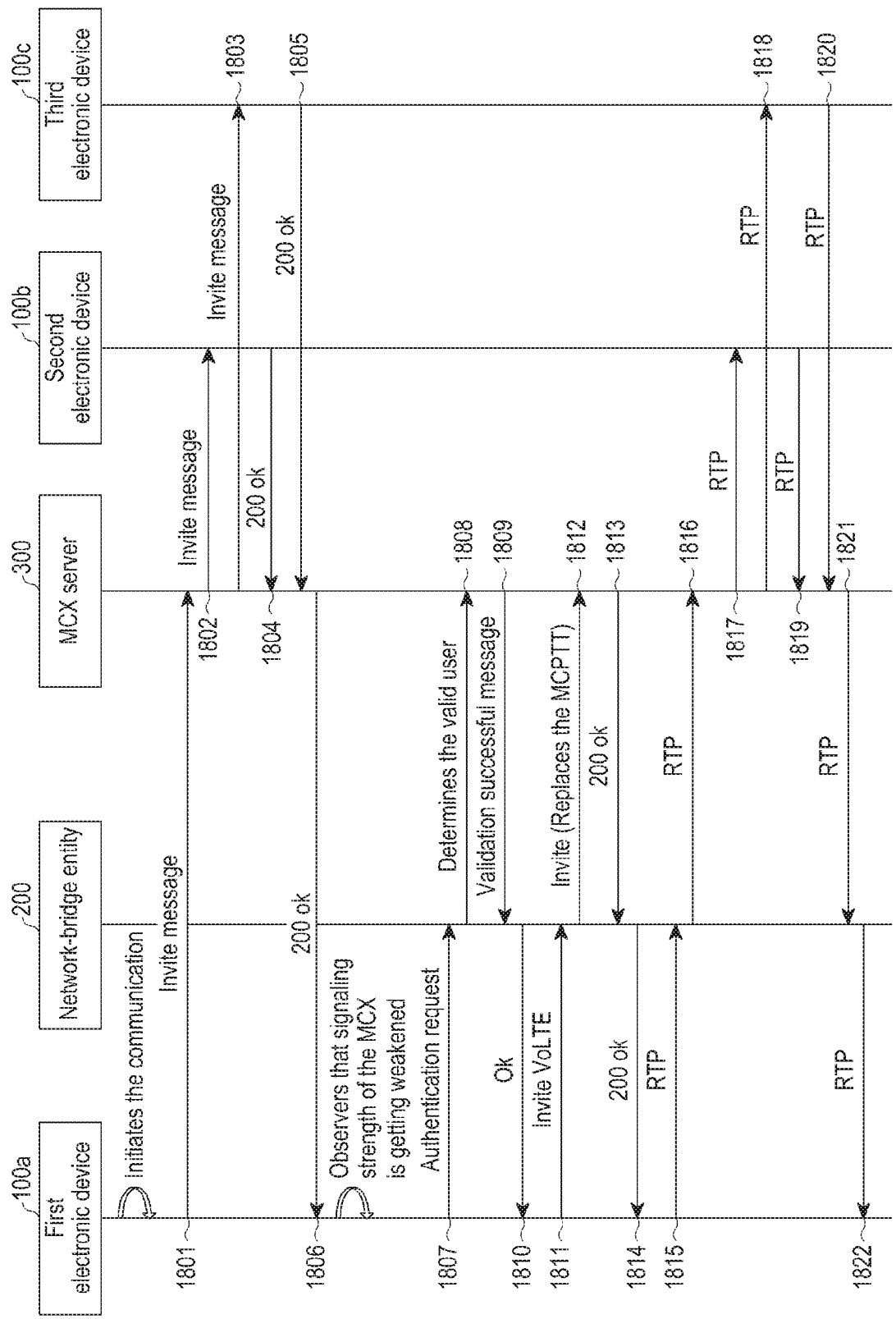
FIG. 18 illustrates a flow diagram illustrating various operations for handover procedures in the MCX, according to an embodiment.

FIG. 18 illustrates a flow diagram illustrating various operations for the handover procedures in an MCX, according to an embodiment.

The first electronic device 100a initiates the communication. At operation 1801, the first electronic device 100a sends the "invite MCPTT" message to the MCPTT server 300. At operation 1802, the MCPTT server 300 sends an invite message to the second electronic device 100b. At operation 1803, the MCPTT server 300 sends an invite message to the third electronic device 100c. At operation 1804, the second electronic device 100b sends a response message (e.g., 200 ok) to the MCPTT server 300 and the third electronic device 100c sends a response message (e.g., 200 ok) to the MCPTT server 300 at operation 1805. At operation 1806, the MCPTT server 300 sends a response message (e.g., 200 ok) to the first electronic device 100a.

Further, the first electronic device 100a observers that signaling strength of the MCX is getting weakened, so that the first electronic device 100a sends the authentication message to the network-bridge entity 200 at operation 1807. The first electronic device 100a sends the existing token, password, or any other identifier for authentication to the network-bridge entity 200. At operation 1808, the network-bridge entity 200 determines a valid user as the network-bridge entity 200 contacts the sever 300 and determines the valid user. At operation 1809, the MCPTT server 300 sends a validation successful message to the network-bridge entity 200. At operation 1810, the network-bridge entity 200 sends the validation successful message to the first electronic device 100a.

Once the validation is successful, the first electronic device 100a makes the VoLTE call, so that the first electronic device 100a sends the invite message related to the VoLTE to the network-bridge entity 200. The network-bridge entity 200 replaces the call leg between the first electronic device 100a and the server 300. The network-bridge entity 200 sends the invite message to the server 300. At operation 1813, the MCPTT server 300 sends a response message (e.g., 200 ok) to the network-bridge entity 200. At operation 1814, the network-bridge entity 200 sends a response message (e.g., 200 ok) to the first electronic device 100a.

At operation 1815, the first electronic device 100a sends an RTP message to the network-bridge entity 200. The network-bridge entity 200 takes care of decrypting VoLTE call RTP and encrypt the MCPTT RTP using the key obtained on behalf of the user. At operation 1816, the network-bridge entity 200 sends an RTP message to the server 300.

At operation 1817, the MCPTT server 300 sends an RTP message to the second electronic device 100b. At operation 1818, the MCPTT server 300 sends an RTP message to the third electronic device 100c. At operation 1819, the second electronic device 100b sends an RTP response message to the MCPTT server 300 and the third electronic device 100c sends an RTP response message to the MCPTT server 300 at operation 1820. At operation 1821, the MCPTT server 300 sends an RTP response message to the network-bridge entity 200. At operation 1822, the network-bridge entity 200 sends the RTP response message to the first electronic device 100a.

In order to illustrate the concept of handling the MCX in the wireless communication network, the example is in the context of an VoLTE call. However, a person having ordinary skill in the art would understand that the same signaling procedure is also applicable to the Vo3G call, the ViLTE call, the VoWiFi call, the VoNR call, etc.

Figure 19:
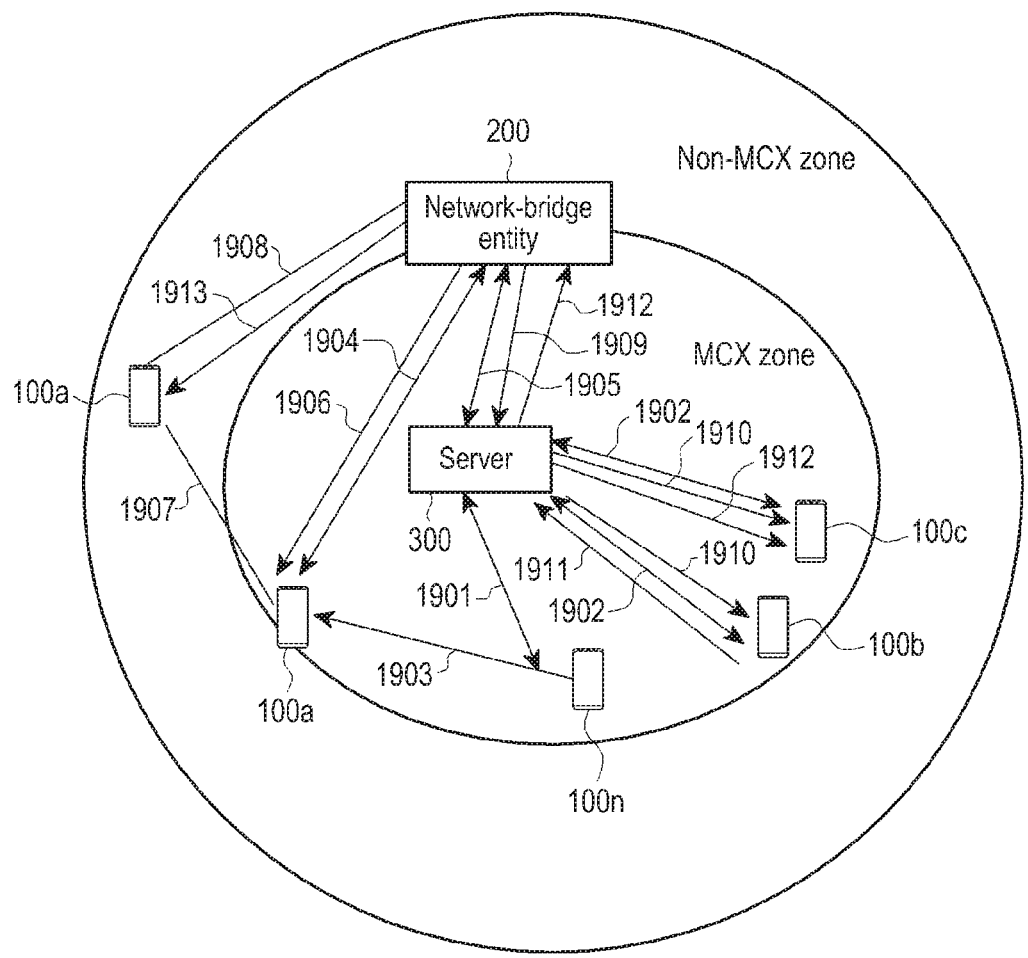
FIG. 19 illustrates an example scenario in which the system handling the handover procedures in the MCX is explained, according to an embodiment.

FIG. 19 illustrates an example scenario in which the system handling the handover procedures in the MCX is explained, according to embodiments as disclosed herein. Consider an example, the first electronic device 100a establishes group call with the server 300 at operation 1901. The second electronic device 100b and a third electronic device 100c join the group call at operation 1902. At operation 1903, the first electronic device 100a is moving out of the MCPTT zone and signal strength gradually reduces then the first electronic device 100a contacts the network-bridge entity 200 to establish a PS-based voice call post authentication at operation 1904. At operation 1905, the network-bridge entity 200 contacts the server 300 and replaces the previous MCPTT session. At operation 1906, the network-bridge entity 200 confirms call success to the first electronic device 100a, and in turn the first electronic device 100a clears the MCPTT session locally. At operation 1907, the first electronic device 100a moves out of the MCPTT zone completely and the first electronic device 100a sends the media to the network-bridge entity 200 at operation 1908. At operation 1909, the network-bridge entity 200 forwards the media to the server 300 and the server 300 forwards the media to other electronic device (e.g., second electronic device 100b and third electronic device 100c) in the group call at operation 1910. At operation 1911, if one of the electronic device (e.g., second electronic device 100b) tries to communicate with other electronic device (i.e., third electronic device) then the server 300 forwards the media to the network-bridge entity 200 at operation 1912 and the network-bridge entity 200 forwards the media to the first electronic device 100*a* over the VoLTE session at operation 1913.

Figure 20:
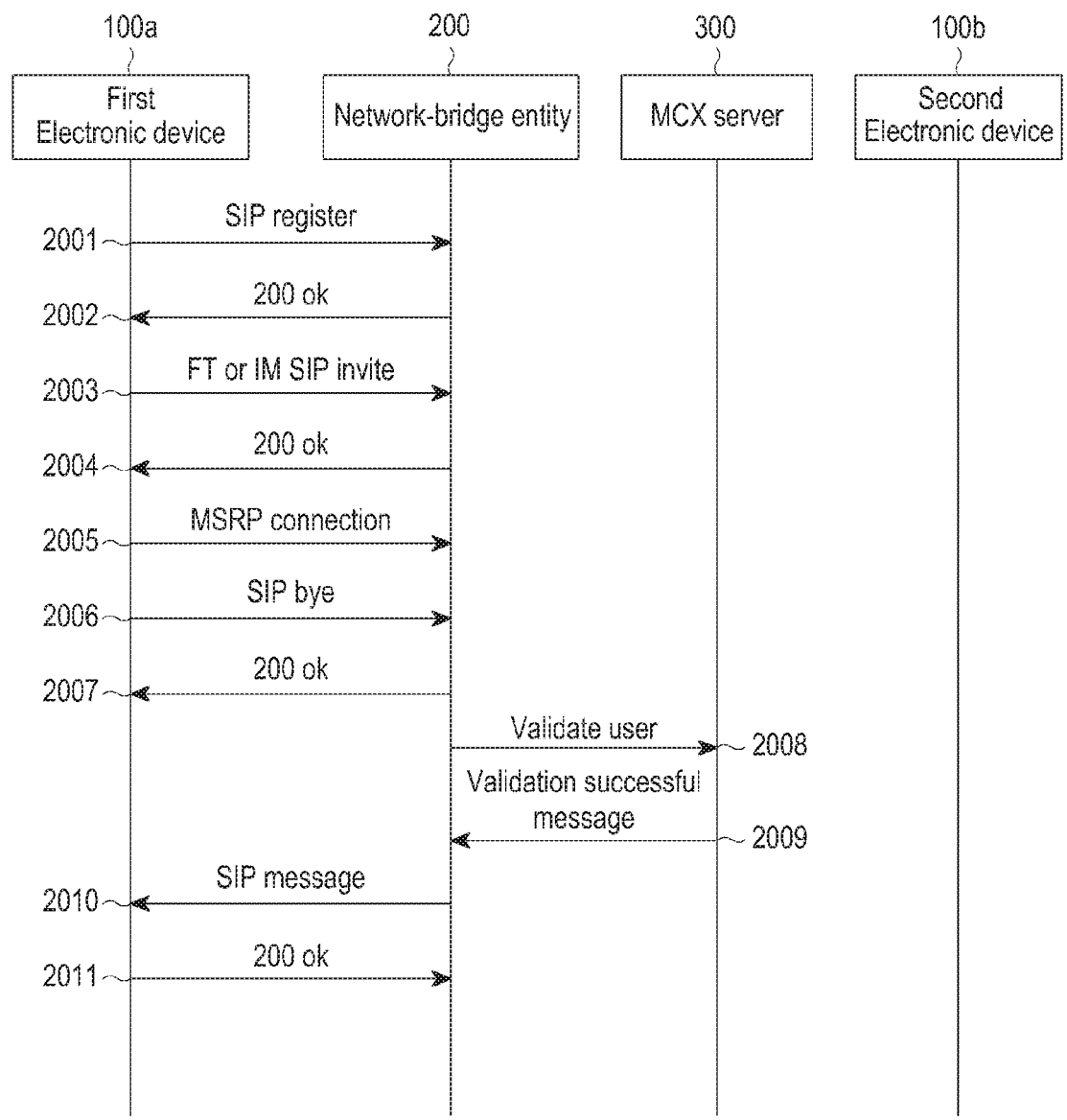
FIG. 20 illustrates a flow diagram illustrating various operations for authentication procedures over a rich communication services (RCS) network during an augmented MCX, according to an embodiment.

FIG. 20 illustrates a flow diagram illustrating various operations for authentication procedures over the RCS during the augmented MCX, according to an embodiment.

At operation 2001, the first electronic device 100*a* sends a SIP register message to the network-bridge entity 200, and the network-bridge entity 200 sends the response message (e.g., 200 OK) to the first electronic device 100*a*, at operation 2002, so that the RCS service is registered between the first electronic device 100*a* and the network-bridge entity 200.

At operation 2003, the first electronic device 100*a* sends a file transfer (FT) or instant message (IM) SIP invite message to the network-bridge entity 200, and the network-bridge entity 200 sends the response message (e.g., 200 OK) to the first electronic device 100*a* at operation 2004.

At operation 2005, the first electronic device 100*a* sends a message session relay protocol (MSRP) connection request to the network-bridge entity 200. The first electronic device 100*a* sends the existing token, password, or any other identifier for authentication to the network-bridge entity 200. At operation 2006, the first electronic device 100*a* sends a SIP bye message to the network-bridge entity 200. The network-bridge entity 200 sends the response message (e.g., 200 OK) to the first electronic device 100*a* at operation 2007.

At operation 2008, the network-bridge entity 200 determines a valid user as the network-bridge entity 200 contacts the sever 300 and determines the valid user. At operation 2009, the MCPTT server 300 sends a validation successful message to the network-bridge entity 200. At operation 2010, the network-bridge entity 200 sends the SIP message to the first electronic device 100*a*. The first electronic device 100*a* response message (e.g., 200 OK) to the network-bridge entity 200 at operation 2011, so that the user validation is successful.

Figure 21A:
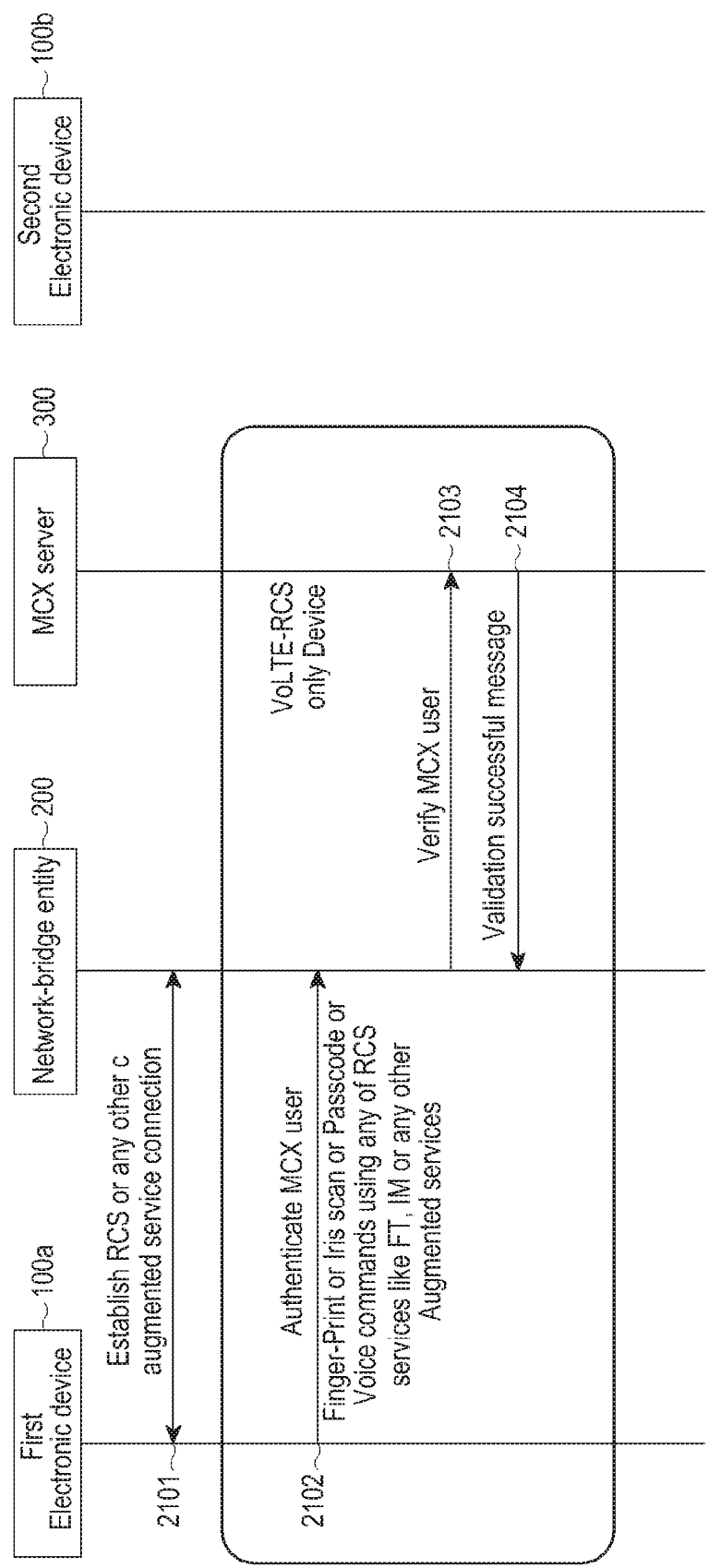

FIGS. 21A and 21B illustrate other flow diagrams illustrating various operations for authentication procedures over the RCS during the augmented MCX, according to an embodiment.

As shown in FIG. 21A, at operation 2101, the first electronic device 100*a* establishes the RCS or any other augmented service connection to the network-bridge entity 200. At operation 2102, the first electronic device 100*a* sends the authentication request to the network-bridge entity 200 using the fingerprint, iris scan, passcode, or voice commands. The network-bridge entity 200 verifies the MCX user with the MCX server 300 at operation 2103. At operation 2104, the MCX server 300 sends the validation successful message to the network-bridge entity 200.

As shown in FIG. 21B, at operation 2105, the first electronic device 100*a* establishes the RCS or any other augmented service connection to the network-bridge entity 200. The last access token stored in the hybrid electronic device is fetched from the MCX server 300, while the electronic device 100*a* was in the MCX zone. At operation 2106, the first electronic device 100*a* sends the authenticate request for the MCX user to the network-bridge entity 200 based on the fingerprint, iris scan, passcode, or the voice commands.

At operation 2107, the network-bridge entity 200 identifies the MCX user via the MCX controller 210. At operation 2108, the network-bridge entity 200 fetches the access token for the MCX user. At operation 2109, the network-bridge entity 200 decrypts using the user access token and verifies the MCX user. Based on the authentication, the network-bridge entity 200 sends the authentication successful message to the electronic device 100*a* via same augmented service at operation 2110.

The various embodiments disclosed herein can be implemented through at least one software program running on at least one hardware device and performing network management functions to control the elements.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, those skilled in the art will recognize that the embodiments herein can be practiced with modification within the spirit and scope of the embodiments as described herein.

What is claimed is:

1. A method for providing a mission critical service (MCX) in a wireless communication network, the method comprising:
   receiving, by a network-bridge entity that interfaces communication between a non-MCX zone and an MCX zone in the wireless communication network, a communication request from an electronic device that is in the non-MCX zone;
   registering, by the network-bridge entity, the electronic device with an MCX server that is in the MCX zone;
   establishing, by the network-bridge entity, an MCX with the MCX server; and
   transferring, by the network-bridge entity, an MCX functionality to the electronic device in the non-MCX zone, wherein the MCX functionality includes a virtual MCX user interface (UI) for displaying one or more selectable options on the electronic device.

2. The method of claim 1, wherein the one or more selectable options comprise at least two of an MCX request for accessing a floor, an MCX request for releasing a floor, an MCX request for accessing a private group, an MCX request to join a video group, an MCX request to view available groups.

3. The method of claim 1, wherein the transferring the MCX functionality to the electronic device in the non-MCX zone comprises:
   connecting, by the network-bridge entity, the electronic device in the non-MCX zone with the established MCX;
   receiving, by the network-bridge entity, a request from the electronic device to access a floor or transmission control for media transmission with the MCX server; and
   notifying, by the network-bridge entity, the electronic device of at least one access response from the MCX.

4. The method of claim 1, wherein the communication request is at least one of a voice over long-term evolution (VoLTE) communication request, a video over LTE (ViLTE) communication request, a voice over new radio (VoNR) communication request, and a voice over Wi-Fi (VoWiFi) communication request.

5. The method of claim 1, wherein the network-bridge entity is one of a gateway, a server, and a relay.

6. The method of claim 5, wherein the relay is a hybrid electronic device that is capable of the MCX and a packet switched (PS) service, and registered in an MCX network.

7. The method of claim 1, further comprising:
receiving, by the network-bridge entity, an MCX user interface (UI) from the MCX server representing one of a flow of the MCX and the MCX functionality;
generating, by the network-bridge entity, a virtual MCX UI simulating the MCX UI received from the MCX server; and
transferring, by the network-bridge entity, the virtual MCX UI to the electronic device.

8. The method of claim 7, wherein the virtual MCX UI is transferred by the network-bridge entity to the electronic device using one of a voice over long-term evolution (VoLTE) communication request, a video over LTE (ViLTE) communication request, a voice over new radio (VoNR) communication request, and a voice over Wi-Fi (VoWiFi) communication request.

9. The method of claim 1, further comprising authenticating, the network-bridge entity, the electronic device based on at least one of biometric data and an access token of a user of the electronic device before the establishing the MCX with the MCX server.

10. The method of claim 9, wherein the access token stored in the electronic device is fetched from the MCX server, while the electronic device is in the MCX zone.

11. A network-bridge entity for providing a mission critical service (MCX) in a wireless communication network, the network-bridge entity comprising:
a memory;
a processor configured to execute instructions stored in the memory; and
an MCX controller configured to interface communication between a non-MCX zone and an MCX zone in the wireless communication network,
wherein the MCX controller is further configured to:
receive a communication request from an electronic device that is in the non-MCX zone,
register the electronic device with an MCX server that is in the MCX zone,
establish an MCX with the MCX server, and
transfer an MCX functionality to the electronic device in the non-MCX zone, the MCX functionality including a virtual MCX user interface (UI) for displaying one or more selectable options on the electronic device.

12. The network-bridge entity of claim 11, wherein the one or more selectable options comprises at least two of an MCX request for accessing a floor, an MCX request for releasing a floor, an MCX request for accessing a private group, an MCX request to join a video group, an MCX request to view available groups.

13. The network-bridge entity of claim 11, wherein the MCX controller is further configured to transfer the MCX functionality to the electronic device in the non-MCX zone by:
connecting the electronic device in the non-MCX zone with the established MCX;
receiving a request from the electronic device to access a floor or transmission control for media transmission with the MCX server; and
notifying the electronic device of at least one access response from the MCX.

14. The network-bridge entity of claim 11, wherein the communication request is at least one of a voice over long-term evolution (VoLTE) communication request, a video over LTE (ViLTE) communication request, a voice over new radio (VoNR) communication request, and a voice over Wi-Fi (VoWiFi) communication request.

15. The network-bridge entity of claim 11, wherein the network-bridge entity is one of a gateway, a server, and a relay.

16. The network-bridge entity of claim 15, wherein the relay is a hybrid electronic device that is capable of the MCX and a packet switched (PS) service, and registered in an MCX network.

17. The network-bridge entity of claim 11, wherein the MCX controller is further configured to:
receive an MCX user interface (UI) from the MCX server representing one of a flow of the MCX and the MCX functionality;
generate a virtual MCX UI simulating the MCX UI received from the MCX server; and
transfer the virtual MCX UI to the electronic device.

18. The network-bridge entity of claim 17, wherein the virtual MCX UI is transferred by the network-bridge entity to the electronic device using one of a voice over long-term evolution (VoLTE) communication request, a video over LTE (ViLTE) communication request, a voice over new radio (VoNR) communication request, and a voice over Wi-Fi (VoWiFi) communication request.

19. The network-bridge entity of claim 11, wherein the MCX controller is further configured to authenticate the electronic device based on at least one of biometric data and an access token of a user of the electronic device before establishing the MCX with the MCX server.

20. The network-bridge entity of claim 19, wherein the access token stored in the electronic device is fetched from the MCX server, while the electronic device is in the MCX zone.

* * * * *